United States Patent
Gengler

(10) Patent No.: US 10,013,074 B2
(45) Date of Patent: *Jul. 3, 2018

(54) ACCESSORY AND SUPPORT FOR ELECTRONIC DEVICES, SYSTEMS INCLUDING THE SAME AND METHODS

(71) Applicant: ZAGG Intellectual Property Holding Co., Inc., Salt Lake City, UT (US)

(72) Inventor: David P. Gengler, Draper, UT (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/998,016

(22) Filed: Dec. 23, 2015

(65) Prior Publication Data

US 2017/0024018 A1   Jan. 26, 2017

Related U.S. Application Data

(63) Continuation of application No. 13/532,281, filed on Jun. 25, 2012, now Pat. No. 9,218,024.

(Continued)

(51) Int. Cl.
*G06F 3/02* (2006.01)
*G06F 1/16* (2006.01)

(52) U.S. Cl.
CPC .......... *G06F 3/0202* (2013.01); *G06F 1/1632* (2013.01); *G06F 1/1637* (2013.01); *G06F 1/1656* (2013.01); *Y10T 29/49002* (2015.01)

(58) Field of Classification Search
CPC .... G06F 3/0202; G06F 1/1637; G06F 1/1656; G06F 1/1632; Y10T 29/49002
See application file for complete search history.

(56) References Cited

U.S. PATENT DOCUMENTS

| 289,652 A | 12/1883 | Haynes |
| 358,583 A | 3/1887 | Timms |

(Continued)

FOREIGN PATENT DOCUMENTS

| DE | 20101039 | 5/2001 |
| EP | 0539099 | 4/1993 |

(Continued)

OTHER PUBLICATIONS

Withi Pod Community for Korean Ipod Users; http://withipod.neU?mid=podmagazinenotice&category=207   8464 &searchkeyword=tocken&search   target=title &document_sri=2078532; Nov. 22, 2004.

(Continued)

*Primary Examiner* — Dimary Lopez Cruz
*Assistant Examiner* — Abhishek Rathod
(74) *Attorney, Agent, or Firm* — Durham Jones & Pinegar, P.C.

(57) ABSTRACT

An accessory for an electronic device, such as a mobile computing device, includes a housing and a support element that are configured to support the electronic device in an inclined orientation. The support element of the accessory may comprise an elongated recess that receives a portion (e.g., an edge portion) of an electronic device to orient and support the electronic device in the inclined orientation. The accessory may also include a peripheral component, such as a user interface component (e.g., a keyboard, a track pad, etc.) or any other component that may enhance or supplement functionality of the electronic device.

20 Claims, 13 Drawing Sheets

Related U.S. Application Data

(60) Provisional application No. 61/503,467, filed on Jun. 30, 2011, provisional application No. 61/500,570, filed on Jun. 23, 2011.

(56) References Cited

U.S. PATENT DOCUMENTS

| | | |
|---|---|---|
| D23,076 S | 2/1894 | Andrew |
| 649,293 A | 5/1900 | French |
| 756,486 A | 4/1904 | Fleming |
| 805,895 A | 11/1905 | Wedderburn |
| D44,999 S | 12/1913 | Fraser |
| 1,169,869 A | 2/1916 | Richards |
| 1,203,659 A | 11/1916 | Smith |
| 1,308,010 A | 6/1919 | Gibson |
| 1,475,134 A | 11/1923 | Oakes |
| 1,499,113 A | 6/1924 | McNally |
| 1,588,618 A | 6/1926 | Rosen |
| 1,704,561 A | 3/1929 | Egan |
| 1,957,153 A | 5/1934 | Smiley, Jr. |
| 2,165,255 A | 7/1939 | Hamilton |
| D125,415 S | 2/1941 | Freligh |
| 2,252,571 A | 8/1941 | Kohn |
| D130,450 S | 11/1941 | Brown |
| D139,823 S | 12/1944 | Jones |
| 2,373,617 A | 4/1945 | Tiryakian |
| 2,401,811 A | 6/1946 | Atticks |
| D163,463 S | 5/1951 | Lewis |
| 2,627,343 A | 2/1953 | Gallagher |
| D173,318 S | 10/1954 | Levenhagen |
| D173,319 S | 10/1954 | Levenhagen |
| 2,726,835 A | 12/1955 | Hummel |
| 2,841,903 A | 7/1958 | Christensen |
| 2,916,236 A | 12/1959 | Cross et al. |
| 2,920,409 A | 1/1960 | Sampson |
| 2,946,545 A | 7/1960 | Sampson |
| D193,487 S | 8/1962 | Levenhagen |
| 3,125,356 A | 3/1964 | Cline |
| D201,732 S | 7/1965 | Bunn et al. |
| 3,195,850 A | 7/1965 | Steiner |
| 3,275,281 A | 9/1966 | Sampson |
| D208,331 S | 8/1967 | Gehl et al. |
| 3,367,679 A | 2/1968 | Slanhoff |
| 3,463,378 A | 8/1969 | Van Daalen |
| D218,352 S | 8/1970 | Hoch |
| 3,544,134 A | 12/1970 | Sibley |
| D221,349 S | 8/1971 | Bridges et al. |
| D224,366 S | 7/1972 | Rehrig |
| D224,735 S | 9/1972 | Reifers |
| D224,751 S | 9/1972 | Propst et al. |
| D226,284 S | 2/1973 | Bateman |
| D226,285 S | 2/1973 | Bateman |
| 3,758,065 A | 9/1973 | Ranseen |
| D229,894 S | 1/1974 | Reifers |
| 3,785,605 A | 1/1974 | Parekh |
| 3,800,022 A | 3/1974 | Buteux |
| D243,378 S | 2/1977 | Tharp |
| D243,977 S | 4/1977 | Roberts |
| 4,044,980 A | 8/1977 | Cummins |
| D247,025 S | 1/1978 | Cherry |
| 4,093,759 A | 6/1978 | Otsuki et al. |
| 4,111,305 A | 9/1978 | Thomas |
| D250,443 S | 12/1978 | Romanoff |
| 4,259,568 A | 3/1981 | Dynesen |
| D260,568 S | 9/1981 | Cherry |
| D261,904 S | 11/1981 | Polhemus |
| D264,032 S | 4/1982 | Rule |
| 4,353,470 A | 10/1982 | Polhemus et al. |
| D269,218 S | 5/1983 | Berman |
| D272,637 S | 2/1984 | Barbieri et al. |
| D272,726 S | 2/1984 | Kaneko |
| D274,441 S | 6/1984 | Stevenson |
| 4,460,146 A | 7/1984 | Raggiotti |
| D277,295 S | 1/1985 | Jones |
| D278,990 S | 5/1985 | Kaneko |
| D279,085 S | 6/1985 | Kaneko |
| D279,185 S | 6/1985 | Felix et al. |
| 4,555,084 A | 11/1985 | Anderson et al. |
| 4,555,128 A | 11/1985 | White et al. |
| D282,042 S | 1/1986 | Gallagher |
| D282,043 S | 1/1986 | Morin |
| D282,335 S | 1/1986 | Dodd et al. |
| 4,574,944 A | 3/1986 | Gregory |
| 4,575,037 A | 3/1986 | Hammar |
| 4,576,115 A | 3/1986 | Gordon |
| D283,993 S | 5/1986 | Kaneko |
| D284,611 S | 7/1986 | Cotney et al. |
| D284,953 S | 8/1986 | Kaneko |
| 4,607,817 A | 8/1986 | Aquino |
| D286,352 S | 10/1986 | Huculak |
| 4,657,148 A | 4/1987 | Heng |
| D291,204 S | 8/1987 | Hampshire et al. |
| D292,357 S | 10/1987 | Narain |
| 4,709,895 A | 12/1987 | Mardak |
| 4,722,504 A | 2/1988 | Degenholtz |
| D294,957 S | 3/1988 | Lothe |
| D297,073 S | 8/1988 | Curci |
| 4,771,976 A | 9/1988 | Su |
| D298,489 S | 11/1988 | Sornborger |
| D298,968 S | 12/1988 | McAllister |
| D300,785 S | 4/1989 | Sorge et al. |
| 4,834,242 A | 5/1989 | Selack et al. |
| D305,015 S | 12/1989 | Roche |
| D305,035 S | 12/1989 | Yon et al. |
| 4,886,231 A | 12/1989 | Doerksen |
| 4,887,724 A | 12/1989 | Pielechowski et al. |
| 4,907,703 A | 3/1990 | Alger et al. |
| D307,500 S | 4/1990 | Mullaly |
| D307,967 S | 5/1990 | Lanius |
| D308,274 S | 5/1990 | Gosselin et al. |
| D308,497 S | 6/1990 | Roche |
| D309,059 S | 7/1990 | Bledsoe |
| D309,971 S | 8/1990 | Quong |
| D310,896 S | 9/1990 | Winjum |
| D313,493 S | 1/1991 | Apps et al. |
| 4,991,812 A | 2/1991 | MacEwan |
| D317,467 S | 6/1991 | Kheng |
| 5,027,961 A | 7/1991 | Howitt |
| D319,472 S | 8/1991 | Clyburn |
| D322,245 S | 12/1991 | Lin |
| D323,616 S | 2/1992 | Mueller |
| 5,105,338 A | 4/1992 | Held |
| 5,109,985 A | 5/1992 | Rose |
| D327,200 S | 6/1992 | Szablak et al. |
| D327,503 S | 6/1992 | Szablak et al. |
| D327,504 S | 6/1992 | Breen et al. |
| D328,302 S | 7/1992 | Murzanski et al. |
| D328,314 S | 7/1992 | MacEwan |
| 5,128,662 A * | 7/1992 | Failla .............. G06F 1/1601 248/924 |
| 5,132,588 A | 7/1992 | Warman |
| D328,985 S | 9/1992 | Sheldon |
| D330,729 S | 11/1992 | Cornell |
| D333,574 S | 3/1993 | Ackeret |
| 5,213,302 A | 5/1993 | Rowe, Jr. |
| 5,253,139 A | 10/1993 | Satou |
| 5,263,668 A | 11/1993 | Reiter |
| D342,364 S | 12/1993 | Hobson |
| D344,197 S | 2/1994 | Numbers |
| D348,284 S | 6/1994 | Thorud et al. |
| 5,335,675 A | 8/1994 | Wheeler et al. |
| 5,337,985 A | 8/1994 | Hale |
| D358,583 S | 5/1995 | Winkler |
| 5,415,293 A | 5/1995 | Ackermann et al. |
| 5,458,242 A | 10/1995 | Baka et al. |
| 5,485,980 A | 1/1996 | Luccia |
| 5,530,234 A | 6/1996 | Loh et al. |
| D372,896 S | 8/1996 | Nagele et al. |
| D376,787 S | 12/1996 | Calfee |
| D377,294 S | 1/1997 | Brady |
| 5,620,163 A | 4/1997 | Wu |
| 5,639,004 A | 6/1997 | Carlton et al. |
| 5,645,165 A | 7/1997 | Taniyama |
| D382,300 S | 8/1997 | Thorne et al. |

(56) References Cited

U.S. PATENT DOCUMENTS

| | | |
|---|---|---|
| 5,677,050 A | 10/1997 | Bilkadi et al. |
| 5,685,441 A | 11/1997 | Calfee |
| D388,263 S | 12/1997 | Amerault |
| 5,708,560 A | 1/1998 | Kumar et al. |
| 5,730,644 A | 3/1998 | Pfanstiehl |
| D395,640 S | 6/1998 | Goodman et al. |
| 5,820,957 A | 10/1998 | Shroeder et al. |
| 5,833,116 A | 11/1998 | Guillin |
| 5,871,189 A | 2/1999 | Hoftman |
| D411,767 S | 7/1999 | Keller |
| 5,927,673 A | 7/1999 | Kurokawa et al. |
| D412,786 S | 8/1999 | Killinger |
| D413,872 S | 9/1999 | Jessen |
| 6,003,831 A | 12/1999 | Coleman |
| 6,050,200 A | 4/2000 | Sullins et al. |
| 6,082,535 A | 7/2000 | Mitchell |
| 6,082,696 A | 7/2000 | Patterson |
| 6,094,341 A | 7/2000 | Lin |
| 6,113,052 A | 9/2000 | Gentile et al. |
| 6,129,323 A | 10/2000 | Mandokoro et al. |
| 6,142,868 A | 11/2000 | Pfanstiehl |
| 6,151,486 A | 11/2000 | Holshouser et al. |
| 6,154,359 A | 11/2000 | Kamikakai et al. |
| 6,164,451 A | 12/2000 | Sherman |
| D437,709 S | 2/2001 | Edstrom |
| 6,186,343 B1 | 2/2001 | Brown |
| D440,117 S | 4/2001 | Claffy et al. |
| 6,219,681 B1 | 4/2001 | Hawkins et al. |
| 6,231,023 B1 | 5/2001 | Morton |
| D443,999 S | 6/2001 | Cable |
| 6,249,431 B1 | 6/2001 | Chan |
| 6,250,765 B1 | 6/2001 | Murakami |
| 6,256,193 B1 | 7/2001 | Janik et al. |
| 6,259,597 B1 | 7/2001 | Anzai et al. |
| 6,270,049 B1 | 8/2001 | Olvey |
| 6,282,082 B1 | 8/2001 | Armitage et al. |
| 6,293,591 B1 | 9/2001 | Pecci |
| 6,297,981 B1 | 10/2001 | Berberich et al. |
| 6,307,741 B1 | 10/2001 | Karidis et al. |
| D454,533 S | 3/2002 | Benson |
| D456,454 S | 4/2002 | Bond et al. |
| 6,372,313 B1 | 4/2002 | D'alessio et al. |
| 6,408,132 B1 | 6/2002 | Ishikawa |
| 6,480,373 B1 | 11/2002 | Landry et al. |
| 6,487,068 B1 | 11/2002 | Rahemtulla |
| 6,492,974 B1 | 12/2002 | Nobuchi et al. |
| 6,568,543 B1 | 5/2003 | Schneider |
| D477,365 S | 7/2003 | Chen |
| 6,596,400 B1 | 7/2003 | Friedman et al. |
| D479,062 S | 9/2003 | Meyer |
| 6,613,411 B2 | 9/2003 | Kollaja et al. |
| 6,614,423 B1 | 9/2003 | Wong et al. |
| 6,614,722 B2 | 9/2003 | Polany et al. |
| 6,620,281 B1 | 9/2003 | Sommers |
| D483,071 S | 12/2003 | Chen |
| 6,697,045 B2 | 2/2004 | Min |
| 6,697,262 B2 | 2/2004 | Adams et al. |
| 6,700,775 B1 * | 3/2004 | Chuang .............. G06F 1/1626 361/679.01 |
| 6,710,576 B1 | 3/2004 | Kaufman et al. |
| 6,735,698 B1 | 5/2004 | Callam |
| 6,752,430 B2 | 6/2004 | Holt et al. |
| 6,772,879 B1 | 8/2004 | Domotor |
| 6,778,196 B2 | 8/2004 | Nakamura |
| 6,802,416 B1 | 10/2004 | D'Alessio et al. |
| 6,829,140 B2 | 12/2004 | Shimano et al. |
| 6,831,714 B2 | 12/2004 | Masaki et al. |
| 6,841,190 B2 | 1/2005 | Liu et al. |
| D501,666 S | 2/2005 | Chan |
| D502,742 S | 3/2005 | Bain |
| 6,869,299 B2 | 3/2005 | Tanaka et al. |
| 6,870,732 B2 | 3/2005 | Huang et al. |
| 6,878,425 B1 | 4/2005 | Gomes |
| 6,882,524 B2 | 4/2005 | Ulla et al. |
| D510,517 S | 10/2005 | Noack |
| 6,960,040 B2 | 11/2005 | D'alessio et al. |
| D513,008 S | 12/2005 | Takizawa et al. |
| 6,971,622 B2 | 12/2005 | Ziegler et al. |
| 6,975,507 B2 | 12/2005 | Wang et al. |
| 6,975,888 B2 | 12/2005 | Buesseler et al. |
| D517,328 S | 3/2006 | Thrall |
| 7,011,215 B2 | 3/2006 | Meissen et al. |
| D519,121 S | 4/2006 | Zamanian |
| D519,172 S | 4/2006 | Penat et al. |
| 7,025,274 B2 | 4/2006 | Solomon et al. |
| 7,042,713 B2 | 5/2006 | Nicolosi |
| D524,319 S | 7/2006 | Zamanian |
| 7,090,074 B2 | 8/2006 | Isaacs |
| 7,099,149 B2 | 8/2006 | Krieger et al. |
| 7,104,516 B2 | 9/2006 | Uto et al. |
| 7,123,471 B2 | 10/2006 | Wang et al. |
| D534,730 S | 1/2007 | Hardy |
| D537,633 S | 3/2007 | Marnell, II |
| D538,041 S | 3/2007 | Reitze |
| D540,859 S | 4/2007 | Weiler |
| 7,208,833 B2 | 4/2007 | Nobori et al. |
| D542,841 S | 5/2007 | King et al. |
| 7,236,356 B2 | 6/2007 | Ulla et al. |
| 7,287,751 B2 | 10/2007 | Webber, Jr. |
| D555,163 S | 11/2007 | Beilstein et al. |
| D557,259 S | 12/2007 | Hirsch |
| D557,267 S | 12/2007 | Beilstein et al. |
| D557,495 S | 12/2007 | Chan et al. |
| D557,698 S | 12/2007 | Lye |
| 7,318,521 B2 | 1/2008 | Lau |
| D562,589 S | 2/2008 | Mellon |
| D562,637 S | 2/2008 | Gruneisen, III |
| D563,093 S | 3/2008 | Nussberger |
| D563,176 S | 3/2008 | Gruneisen, III |
| D566,192 S | 4/2008 | Bhavnani |
| D567,630 S | 4/2008 | Brassard |
| D567,631 S | 4/2008 | Brassard |
| D569,380 S | 5/2008 | Beilstein et al. |
| 7,389,869 B2 | 6/2008 | Mason, Jr. |
| D573,654 S | 7/2008 | Hardy et al. |
| D574,151 S | 8/2008 | Reitze |
| D574,819 S | 8/2008 | Andre et al. |
| D577,904 S | 10/2008 | Sasaki |
| D584,304 S | 1/2009 | Lin |
| D585,647 S | 2/2009 | Whiteside et al. |
| 7,486,503 B1 | 2/2009 | Wang et al. |
| 7,489,525 B2 | 2/2009 | Cheng et al. |
| 7,495,895 B2 | 2/2009 | Carnevali |
| 7,503,538 B2 | 3/2009 | Liou et al. |
| D592,188 S | 5/2009 | Huang |
| 7,527,235 B2 | 5/2009 | Hummel |
| 7,529,364 B2 | 5/2009 | Buehler |
| 7,537,192 B2 | 5/2009 | Al-Haleem et al. |
| 7,540,466 B2 | 6/2009 | Yang |
| 7,541,907 B2 | 6/2009 | Wang et al. |
| D596,902 S | 7/2009 | Hrovat |
| 7,558,594 B2 | 7/2009 | Wilson |
| D598,197 S | 8/2009 | Ahlstrom |
| 7,578,243 B2 | 8/2009 | Gevaert |
| D600,748 S | 9/2009 | Tabuchi et al. |
| 7,584,841 B2 | 9/2009 | Chan et al. |
| D601,654 S | 10/2009 | Sykes |
| D602,913 S | 10/2009 | Han et al. |
| 7,609,524 B2 | 10/2009 | Ting et al. |
| D604,615 S | 11/2009 | Doster |
| 7,630,745 B2 | 12/2009 | Chen et al. |
| 7,652,452 B2 | 1/2010 | Mori et al. |
| D609,226 S | 2/2010 | Hofer et al. |
| D611,544 S | 3/2010 | Liptan |
| D615,079 S | 5/2010 | Masuyama et al. |
| D616,433 S | 5/2010 | Morishita et al. |
| D616,700 S | 6/2010 | Pourounidis et al. |
| 7,735,644 B2 | 6/2010 | Sirichai et al. |
| D619,089 S | 7/2010 | Chen |
| D619,257 S | 7/2010 | Meschenmoser et al. |
| D619,361 S | 7/2010 | Andre et al. |
| D619,822 S | 7/2010 | Damgaard-Sorensen |
| D621,839 S | 8/2010 | Sweet |
| 7,775,356 B2 | 8/2010 | Palmer |

(56) References Cited

U.S. PATENT DOCUMENTS

| | | |
|---|---|---|
| 7,781,610 B2 | 8/2010 | Schneider et al. |
| D623,180 S | 9/2010 | Diebel |
| D623,874 S | 9/2010 | Jones |
| D624,304 S | 9/2010 | Danze et al. |
| D624,532 S | 9/2010 | Huskinson |
| D624,908 S | 10/2010 | Huskinson |
| D625,524 S | 10/2010 | Schwartz et al. |
| D626,129 S | 10/2010 | Lutz |
| 7,828,260 B2 | 11/2010 | Hauser et al. |
| 7,845,612 B2 | 12/2010 | Mase |
| 7,861,995 B2 | 1/2011 | Liou |
| D631,937 S | 2/2011 | Sykes |
| D633,728 S | 3/2011 | Fabricatore |
| D635,191 S | 3/2011 | Cheetwood |
| 7,907,400 B2 | 3/2011 | Bekele |
| 7,924,554 B2 | 4/2011 | Shen |
| D637,451 S | 5/2011 | Cheng |
| D637,583 S | 5/2011 | Beal et al. |
| D637,592 S | 5/2011 | Magness et al. |
| D639,286 S | 6/2011 | Mohoney |
| D639,296 S | 6/2011 | Tseng et al. |
| D639,816 S | 6/2011 | Bau |
| D640,708 S | 6/2011 | Lee |
| 7,957,524 B2 | 6/2011 | Chipping |
| D641,177 S | 7/2011 | Chamberlain |
| 8,004,834 B2 | 8/2011 | Shih et al. |
| 8,009,143 B2 | 8/2011 | Huang |
| 8,023,256 B2 | 9/2011 | Walker et al. |
| D646,903 S | 10/2011 | Santana |
| D646,904 S | 10/2011 | Feldstein et al. |
| D647,519 S | 10/2011 | Rothbaum et al. |
| D648,529 S | 11/2011 | Brown |
| D648,707 S | 11/2011 | Akana et al. |
| D648,728 S | 11/2011 | Atkins et al. |
| 8,056,725 B2 | 11/2011 | Doster |
| D651,204 S | 12/2011 | Wibby et al. |
| D651,459 S | 1/2012 | Eades et al. |
| 8,100,376 B2 | 1/2012 | Ye |
| 8,126,519 B2 | 2/2012 | Matsuoka |
| D656,500 S | 3/2012 | Maruyama et al. |
| D659,139 S | 5/2012 | Gengler |
| D659,691 S | 5/2012 | Kim et al. |
| D660,809 S | 5/2012 | Koskela et al. |
| 8,173,893 B2 | 5/2012 | Huang |
| D661,693 S | 6/2012 | Andre et al. |
| D662,923 S | 7/2012 | Piedra et al. |
| D662,928 S | 7/2012 | Fahrendorff et al. |
| D664,528 S | 7/2012 | Chen et al. |
| 8,233,109 B2 | 7/2012 | Bergeron et al. |
| D665,210 S | 8/2012 | Hughes |
| D665,735 S | 8/2012 | Kang et al. |
| D665,810 S | 8/2012 | Jones et al. |
| D666,174 S | 8/2012 | Du et al. |
| D666,614 S | 9/2012 | Ding |
| 8,284,543 B2 | 10/2012 | Wang |
| 8,290,549 B2 | 10/2012 | Reeves et al. |
| 8,315,044 B2 | 11/2012 | Wu et al. |
| D672,352 S | 12/2012 | Gengler |
| 8,346,321 B2 | 1/2013 | Huang |
| 8,363,014 B2 | 1/2013 | Leung et al. |
| 8,451,595 B2 | 5/2013 | Leung et al. |
| 8,467,183 B2 | 6/2013 | Probst et al. |
| 8,467,185 B2 | 6/2013 | Probst et al. |
| 8,490,846 B1 * | 7/2013 | Wheatley ............... B60R 11/02 224/277 |
| D696,262 S | 12/2013 | Groene et al. |
| 9,218,024 B2 * | 12/2015 | Gengler ............... G06F 1/1632 |
| 2001/0022719 A1 | 9/2001 | Armitage et al. |
| 2002/0036228 A1 | 3/2002 | Reese et al. |
| 2002/0088918 A1 | 7/2002 | Uto et al. |
| 2002/0162935 A1 | 11/2002 | Hardy |
| 2002/0197069 A1 | 12/2002 | Tomizawa |
| 2003/0090865 A1 | 5/2003 | Silverstein |
| 2003/0112589 A1 | 6/2003 | Shimano et al. |
| 2003/0142474 A1 | 7/2003 | Karidis et al. |
| 2003/0217497 A1 | 11/2003 | Nagel |
| 2004/0007649 A1 | 1/2004 | Vettraino |
| 2004/0090742 A1 | 5/2004 | Son et al. |
| 2004/0195305 A1 | 10/2004 | Dotson |
| 2004/0246386 A1 | 12/2004 | Thomas et al. |
| 2005/0022924 A1 | 2/2005 | Blackburn |
| 2005/0025924 A1 | 2/2005 | Toyama |
| 2005/0047589 A1 | 3/2005 | Chang |
| 2005/0057516 A1 | 3/2005 | Ghosh et al. |
| 2005/0111182 A1 | 5/2005 | Lin et al. |
| 2005/0116334 A1 | 6/2005 | Buehler |
| 2005/0122671 A1 | 6/2005 | Homer |
| 2005/0200608 A1 | 9/2005 | Ulla et al. |
| 2005/0205623 A1 | 9/2005 | Buntain |
| 2005/0231930 A1 | 10/2005 | Jao |
| 2005/0263666 A1 | 12/2005 | Kim |
| 2005/0264988 A1 | 12/2005 | Nicolosi |
| 2006/0007645 A1 | 1/2006 | Chen et al. |
| 2006/0037507 A1 | 2/2006 | Trigg et al. |
| 2006/0040081 A1 | 2/2006 | Hodsdon et al. |
| 2006/0044288 A1 | 3/2006 | Nakamura et al. |
| 2006/0154029 A1 | 7/2006 | Antonini |
| 2006/0177641 A1 | 8/2006 | Breese et al. |
| 2006/0186001 A1 | 8/2006 | Anderson et al. |
| 2006/0222801 A1 | 10/2006 | Mase |
| 2006/0227111 A1 * | 10/2006 | Chou ............... G06F 3/0202 345/168 |
| 2006/0249646 A1 | 11/2006 | Al-Haleem |
| 2006/0289445 A1 | 12/2006 | Colonna |
| 2006/0292319 A1 | 12/2006 | Kurashina et al. |
| 2007/0023559 A1 | 2/2007 | Scapillato et al. |
| 2007/0026234 A1 | 2/2007 | Mase |
| 2007/0057140 A1 | 3/2007 | Liou et al. |
| 2007/0133156 A1 | 6/2007 | Ligtenberg et al. |
| 2007/0165373 A1 | 7/2007 | Merz et al. |
| 2007/0229962 A1 | 10/2007 | Mason, Jr. et al. |
| 2008/0062625 A1 | 3/2008 | Batio |
| 2008/0174942 A1 | 7/2008 | Yang et al. |
| 2008/0180892 A1 | 7/2008 | Lai |
| 2008/0289359 A1 | 11/2008 | Godowski et al. |
| 2009/0009945 A1 | 1/2009 | Johnson et al. |
| 2009/0040703 A1 | 2/2009 | Gotham et al. |
| 2009/0050499 A1 | 2/2009 | Calco et al. |
| 2009/0061956 A1 | 3/2009 | Matsuoka |
| 2009/0073671 A1 | 3/2009 | Lin |
| 2009/0086415 A1 | 4/2009 | Chipping |
| 2009/0301907 A1 | 12/2009 | Mason |
| 2009/0325657 A1 | 12/2009 | Ramsdell et al. |
| 2010/0028586 A1 | 2/2010 | Enlow et al. |
| 2010/0072334 A1 | 3/2010 | Le Gette et al. |
| 2010/0122924 A1 | 5/2010 | Andrews |
| 2010/0123663 A1 | 5/2010 | Leung et al. |
| 2010/0182761 A1 | 7/2010 | Suzuki et al. |
| 2010/0203931 A1 | 8/2010 | Hynecek et al. |
| 2010/0238620 A1 | 9/2010 | Fish |
| 2010/0240427 A1 | 9/2010 | Lee |
| 2010/0270189 A1 | 10/2010 | Pedersen, II et al. |
| 2010/0277858 A1 | 11/2010 | Zhou |
| 2010/0320349 A1 | 12/2010 | Necessary |
| 2011/0024371 A1 | 2/2011 | Lampman et al. |
| 2011/0031287 A1 | 2/2011 | Le Gette et al. |
| 2011/0141677 A1 | 7/2011 | Cheng |
| 2011/0167181 A1 | 7/2011 | Minoo et al. |
| 2011/0168864 A1 | 7/2011 | Marchione |
| 2011/0199727 A1 | 8/2011 | Probst |
| 2011/0259788 A1 | 10/2011 | Zeliff et al. |
| 2011/0260014 A1 | 10/2011 | Chen |
| 2011/0267757 A1 | 11/2011 | Probst et al. |
| 2011/0284420 A1 | 11/2011 | Sajid |
| 2011/0292584 A1 * | 12/2011 | Hung ............... G06F 1/1632 361/679.26 |
| 2011/0297566 A1 * | 12/2011 | Gallagher ............ F16M 11/105 206/320 |
| 2011/0317347 A1 | 12/2011 | Lin et al. |
| 2012/0008269 A1 | 1/2012 | Gengler |
| 2012/0008299 A1 | 1/2012 | Gengler |
| 2012/0037047 A1 | 2/2012 | Moldovan |
| 2012/0057288 A1 | 3/2012 | Chou et al. |
| 2012/0074271 A1 | 3/2012 | Goetz |

(56) References Cited

U.S. PATENT DOCUMENTS

| | | | |
|---|---|---|---|
| 2012/0092195 A1* | 4/2012 | Lin | G06F 1/1626 341/22 |
| 2012/0099263 A1* | 4/2012 | Lin | G06F 1/1626 361/679.09 |
| 2012/0170194 A1 | 7/2012 | Lord et al. | |
| 2012/0170212 A1 | 7/2012 | Gallouzi et al. | |
| 2012/0199501 A1 | 8/2012 | Le Gette et al. | |
| 2012/0211377 A1 | 8/2012 | Sajid | |
| 2012/0243149 A1* | 9/2012 | Gartrell | G06F 1/1616 361/679.01 |
| 2012/0293953 A1 | 11/2012 | Wu et al. | |
| 2012/0327580 A1 | 12/2012 | Gengler | |
| 2012/0327594 A1 | 12/2012 | Gengler | |
| 2013/0106815 A1 | 5/2013 | Virolainen | |
| 2013/0114198 A1 | 5/2013 | Gengler | |
| 2013/0170126 A1 | 7/2013 | Lee | |
| 2013/0258586 A1 | 10/2013 | Shao et al. | |
| 2013/0279096 A1 | 10/2013 | Gengler | |

FOREIGN PATENT DOCUMENTS

| | | |
|---|---|---|
| KR | 2002069820000 | 10/2000 |
| WO | 03036454 | 5/2003 |
| WO | 2007046637 | 4/2007 |

OTHER PUBLICATIONS

Case No. 2008 Dang 3751 and 2009 Dang 1523; Seung-Kyun Oh (president of Korean distributor for ZAGG); Brief for Invalidation and Scope Confirmation Trial of Registered Patent No. 784501; Nov. 14, 2009.

Kenton R. Osborn et al., "Plastic Films"; Technology and Packaging Applications, 1990. A book.

3M "Polyurethane Protective Tape: Preparation and Application Instructions" Technical Bulletin Oct. 2001.

Auto Paint Guard Automobile Clear Bra—Protecting Your Investment website archived at http://web.archive.org/web/20050728232723/http://www.autopaintguard.com/installation_html Jul. 2005.

Tocken Wrapper, Protective film for ipod shuffle; www.tocken.co.kr; 2004-2005.

Tocken Wrapper for iPod mini; http://caizer.com/mid=tech&page=22&document_srl=20234&1istStyle=&page=; Feb. 18, 2005.

http://www.enfun.net/technique/review/?step=20&dataSeqNo=42417; Jan. 13, 2005.

Statement by Min-Woo SEO of Samsung Electronics Co., Ltd., Mar. 10, 2010.

http://www.appleforum.com; AppleForum; Jul.-Nov. 2005.

Tocken Wrapper, User's Review: WITHIPOD Community for Korean Ipod Users; http://www.withipod.net/bbs/zboard/php?id=community_ipod_gallery&no=1224; Mar. 24, 2005.

Tocken Wrapper, User's Review: WITHIPOD Community for Korean Ipod Users; http://www.withipod.net/bbs/zboard/php?id=community_ipod_gallery&no=1188; Mar. 21, 2005.

MacMadang "I hate the Same thing though it is pretty!:Tocken Wrapper" Magazine vol. 162 Jul. 1, 2005.

User's review of Noxk PSP protection film from internet website; http://raven.egloos.com/1076693; Jul. 25, 2005.

Tocken Wrapper sales bulletin published at http://kmug.co.kr; Sep. 11, 2005.

Crandall/Dahl/Lardner "An Introduction to the Mechanics of Solids" Jan. 25, 1996; pp. 273-276.

Case No. 2008 Dang 3751 and 2009 Dang 1523; Presentation for Oral Hearing for Invalidation and Scope Confirmation Trial of Registered Patent No. 784501; Kim & Chang Mar. 16, 2010.

Case No. 2008 Dang 3751 and 2009 Dang 1523; Seung-Kyun Oh (president of Korean distributor for ZAGG); Brief for Invalidation and Scope Confirmation Trial of Registered Patent No. 784501; Sep. 18, 2009; English translation only.

Case No. 2008 Dang 3751 and 2009 Dang 1523; Seung-Kyun Oh (president of Korean distributor for ZAGG); Brief for Invalidation and Scope Confirmation Trial of Registered Patent No. 784501; Oct. 14, 2009.

Case No. 2008 Dang 3751 and 2009 Dang 1523; SGP Brief for Invalidation and Scope Confirmation Trial of Registered Patent No. 784501; Oct. 14, 2009.

International Search Report and Written Opinion for International Patent Application No. PCT/US2012/044016, dated Sep. 14, 2012.

European Patent Office, "Supplementary European Search Report," dated Apr. 12, 2013, in European application No. EP 11 73 3987.

United States Patent and Trademark Office as the International Searching Authority, "International Search Report and Written Opinion," dated Nov. 16, 2011 in International Patent Application No. PCT/US2011/043450.

* cited by examiner

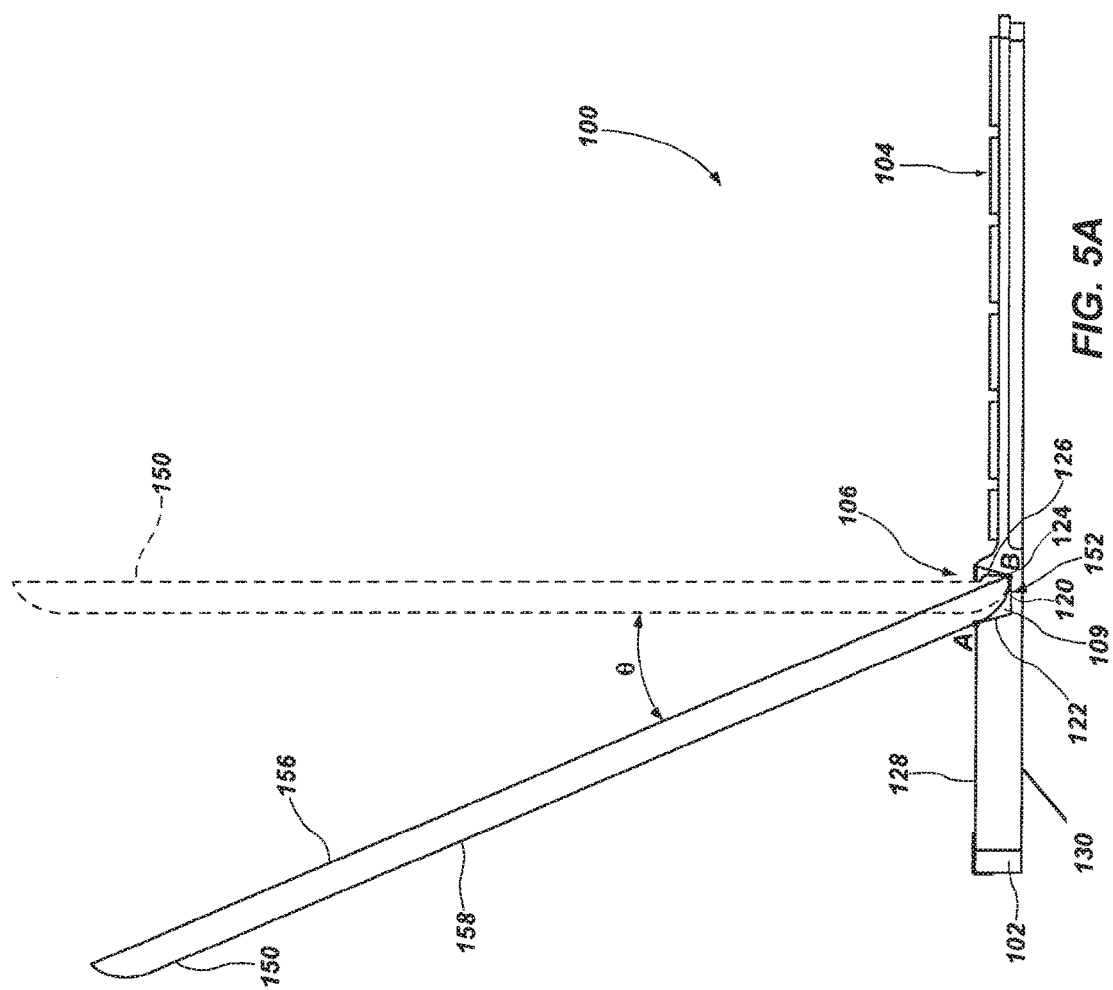

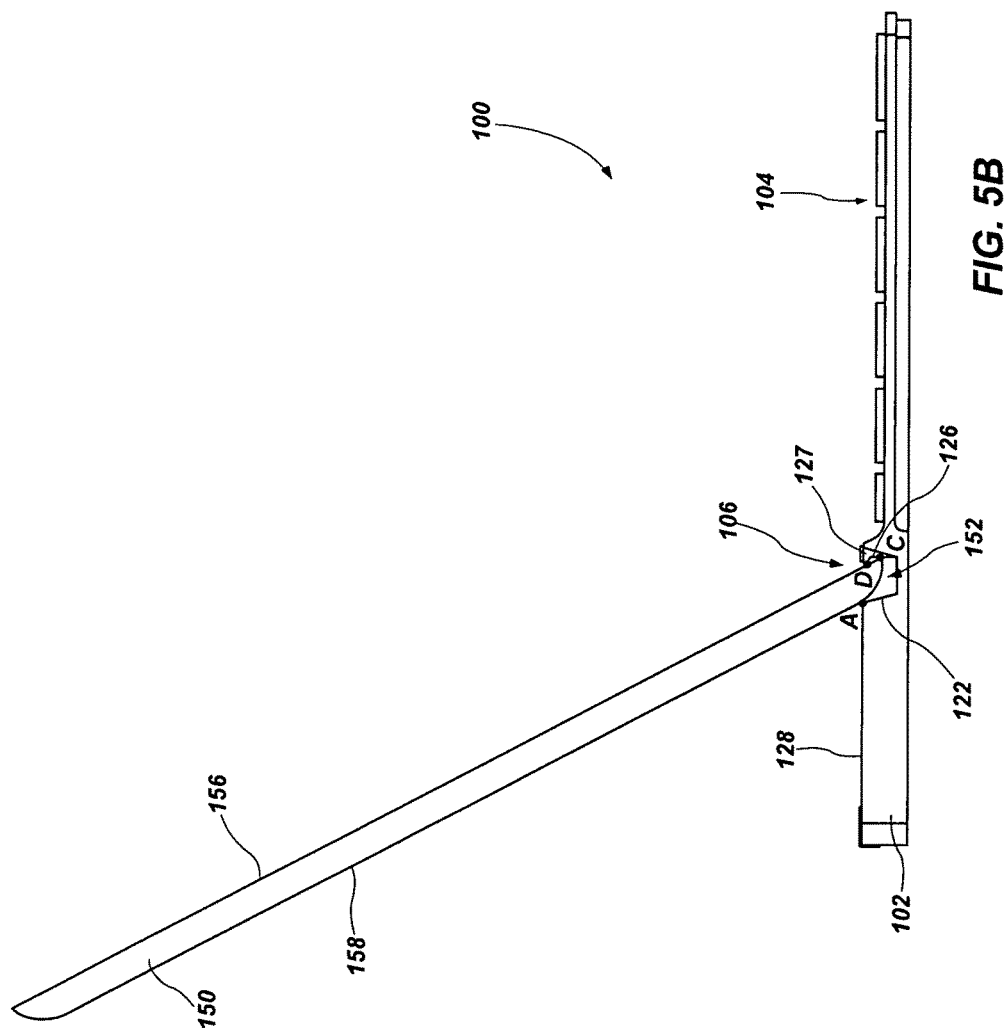

ACCESSORY AND SUPPORT FOR ELECTRONIC DEVICES, SYSTEMS INCLUDING THE SAME AND METHODS

CROSS-REFERENCE TO RELATED APPLICATIONS

This application claims is a continuation of U.S. patent application Ser. No. 13/532,281, filed on Jun. 25, 2012, now U.S. Pat. No. 9,218,024, issued Dec. 22, 2015 ("the '281 Application"). The '281 application claimed the benefit, under 35 U.S.C. § 119(e), to the Jun. 30, 2011, filing date of U.S. Provisional Patent Application No. 61/503,467, ("the '467 Provisional Application"), and to the Jun. 23, 2011, filing date of U.S. Provisional Patent Application No. 61/500,570, ("the '570 Provisional Application"). The entire disclosure of each of the '281 Application, the '467 Provisional Application and the '570 Provisional Application are, by this reference, incorporated herein.

TECHNICAL FIELD

This disclosure relates generally to accessories for electronic devices for use with electronic devices and, more specifically, for accessories for supporting electronic devices. More particularly, an accessory according to this disclosure may be configured to support an electronic device in an at least partially upright, or inclined, orientation. In some embodiments, the accessory may also be configured to enhance or supplement a functionality of the electronic device. Additionally, this disclosure relates to systems and methods for enhancing the functionality of electronic devices.

RELATED ART

Since the advent of mobile computing, efforts have been made to improve the ease with which portable electronic devices may be used, the speeds at which portable electronic devices operate and the availability and quality of wireless network services, as well as to expand the functionality of portable electronic devices. The frequency with which portable electronic devices are used, and the circumstances and locations where portable electronic devices are used, are ever-increasing. In fact, users who carry portable electronic devices often access them many times throughout each day and at multiple locations.

The portability of state-of-the art electronic devices that are configured for use in mobile computing has largely been made possible by advances in technology that enable all of the components of a portable electronic device to be assembled into relatively small, lightweight packages. Many portable electronic devices, such as so-called "smart phones," are configured to be carried in a pocket of an individual's clothing, in a carrying case or in a handbag, backpack or the like. Other mobile computing devices, such as so-called "tablet" or "slate" computers, are also configured to be carried within carrying cases, folios, handbags, backpacks or the like.

Because of the small sizes of state-of-the-art portable electronic devices, the user interface features that enable an individual to enter information into the device are also relatively small. For example, some mobile computing devices include small dedicated input devices, such as keyboards and the like. Regardless of their size, however, small dedicated input devices consume valuable space, decreasing the available display area of an electronic device or adding to the thickness of the electronic device. Furthermore, the smaller the input device, the more difficult it is to use, which may decrease the speed with which an individual may use the input device.

Other electronic devices include touch sensitive displays, which provide both output capabilities and input capabilities. Touch sensitive displays eliminate the need for actual buttons while enabling the maximization of display sizes. When input functions are required or wanted, a touch sensitive displays may display a virtual keyboard. By touching the display at appropriate locations on the virtual keyboard, an individual may type in a manner similar to that employed while using a keyboard with actual buttons. While touch sensitive displays that enable the generation and use of virtual keyboards may enable minimization of the size of an electronic device, when a virtual keyboard is needed or desired, it typically consumes a significant portion of the area of the display, leaving a much smaller viewing area. Although they may maximize display sizes, virtual keyboards may be difficult to use, and certain users may find their lack of tactile response, or haptic feedback, undesirable. Furthermore, small virtual keyboards may increase the likelihood of typing errors and the difficulty in correcting such errors.

In an effort to overcome the shortcomings of small input devices and virtual input devices, a variety of accessories that enhance or supplement the functionality of electronic devices have been developed. These accessories may, for instance, communicate with many state-of-the-art electronic devices by way of one or more wireless protocols (e.g., the BLUETOOTH® open wireless technology standard, an infrared communication protocol, etc.). In cases where the accessories comprise keyboards, the keyboards may be foldable, flexible, or have a reduced size (e.g., width or thickness) to impart them with a desired degree of portability.

A user of an electronic device (e.g., a tablet, e-reader, smart phone, etc.) may occasionally use the electronic device in connection with a stand. The stand may receive and support the electronic device at an inclined angle, which may eliminate the need for an individual to hold the electronic device in the desired orientation. A stand may orient the display of an electronic device in such a way that an individual can view the display while using a separate accessory, such as a keyboard, to interface with the electronic device. When the keyboard, portable electronic device, and stand are not in use, each component can be stored separately, or they can be slipped into one or more compartments of a storage case or carrying case, a folio or a handbag, backpack or the like. As the accessory and support are separate from one another, they can consume an undesirably large amount of storage space, and they may be easily separated from one another.

SUMMARY

An accessory for use with an electronic device is configured to support an electronic device in a working arrangement, such as an at least partially upright, or inclined, orientation, in which an individual may readily view or otherwise interact with a display of the electronic device. In some embodiments, the accessory may be configured to support an electronic device in the working arrangement without the assistance or need for additional or supplemental support from any other apparatus. The accessory may also be configured to enhance or supplement functionality of the electronic device.

The accessory may comprise a user interface (e.g., an input device, an output device, etc.), such as a keyboard, a track pad or the like. Alternatively, the accessory may be configured to provide other input functionality to the electronic device, or it may be configured to provide the electronic device with power (e.g., as a battery, etc.), data storage (i.e., it may serve as external memory), or other input or output functionality.

The accessory may include a housing, which may carry other components of the accessory (e.g., the user interface device, external power supply, data storage, etc.). In addition to carrying other components of the accessory, the housing may carry, define or otherwise comprise a support element. The support element and the housing may be configured to hold an electronic device in a desired working arrangement.

In some embodiments, the support element may comprise an elongated recess, such as a groove or channel configured to receive at least an edge portion of an electronic device and to support the electronic device. In some embodiments, the support element may also include an overhang, or lip, which may extend laterally over a front edge of the elongated recess. Such an overhang may be configured to exert leverage against a surface of the electronic device at the edge portion in a manner that secures the electronic device in place. More specifically, the overhang and the elongated recess, an opposite corner of the recess, an orientation of the electronic device relative to the accessory and the weight of the electronic device may create leverage that, when the electronic device is oriented as desired relative to the accessory, enables the support element to engage the electronic device, holding it in place.

Without limitation, the support element may be configured to orient an electronic device in the working arrangement, which may comprise an inclined, or angled, orientation relative to a remainder of the accessory. Of course, the support element may support an electronic device in any of a number of other suitable manners as well. In at least one embodiment, the support element may support an electronic device without requiring or utilizing supplemental support. The support element may be configured to support an electronic device without any moving parts.

While an accessory according to this disclosure may be configured to be used as a stand-alone device (i.e., in a system that consists essentially of or that consists of the accessory and an electronic device), in some embodiments, an accessory may be configured for assembly with another accessory or component. For instance, an accessory may be configured for assembly with and disassembly from a separate protective case or cover, in which the protective case or cover is configured to be assembled with an electronic device in a manner that protects one or more surfaces of the electronic device from damage. Such a protective case or cover may be configured as a folio, like ZAGG Inc's ZAGGFOLIO® folio cover. Such a cover may protect all surfaces of an electronic device when in a stored (i.e., closed) arrangement, and protect one or more edges and a back side of the electronic device when in a use (i.e., open) arrangement. Other types of protective cases or covers, similar to the ZAGGMATE® protective cases available from ZAGG Inc and Logitech, Inc., may protect only part(s) of an electronic device (e.g., its display and peripheral edges, its display, etc.) when assembled with the electronic device, and may or may not protect the electronic device while the electronic device is being used.

In other embodiments, the accessory may also be configured for assembly with an electronic device in a manner that protects at least a portion of the electronic device, or the accessory may comprise a permanent part of a case or cover (e.g., the ZAGGMATE® protective case, etc.).

In another aspect, methods for orienting an electronic device in a working arrangement are disclosed. An embodiment of such a method may include positioning an edge of an electronic device over an elongated recess in an accessory and inserting the edge and adjacent portions of the electronic device into the elongated recess. An orientation of the electronic device may be adjusted to place the electronic device in a working arrangement relative to the accessory (e.g., the electronic device may be oriented at an inclined angle that is non-parallel to the accessory, etc.). By positioning the electronic device in an inclined orientation relative to the accessory, the accessory may engage the electronic device, at least partially securing the edge portion of the accessory into place within the elongated recess. With the electronic device in place, the accessory may be electronically coupled with the electronic device and used as intended.

When use of the accessory and/or orientation of the electronic device in the working arrangement are no longer needed, the electronic device may be positioned in a less inclined orientation relative to the accessory. In some embodiments, repositioning the electronic device in this manner may cause the accessory to disengage the edge portion of the electronic device, releasing it from the accessory. The electronic device may then be pulled away from the accessory.

Other aspects, as well as the features and advantages of various aspects, of embodiments of the disclosed subject matter will become apparent to those of ordinary skill in the art through consideration of the ensuing description, the accompanying drawings and the appended claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only some embodiments and are not therefore to be considered to be limiting in scope, nor drawn to scale for all embodiments, various embodiments will be described and explained with additional specificity and detail through the use of the accompanying drawings in which:

FIG. 5A is a side profile view of the accessory of FIG. 1, the accessory supporting an electronic device in an embodiment of a working arrangement;

FIG. 5B is a side profile view of the accessory of FIG. 1, the accessory supporting and engaging an electronic device in an embodiment of a working arrangement;

DETAILED DESCRIPTION

FIGS. 1-4 provide various views of an embodiment of an accessory 100 configured for use with an electronic device (not shown in FIGS. 1-4). As shown, the accessory 100 may include a housing 102 that carries at least one support element 106 for orienting and securing the electronic device in a working arrangement. The housing 102 may also carry a peripheral component 104 that enhances or supplements functionality of the electronic device.

In FIGS. 1-4, the peripheral component 104 is depicted as comprising a keyboard. Alternatively, or in addition, the peripheral component 104 may comprise another type of user interface (e.g., a track pad; an audio interface, such as a microphone; a video interface, such as a camera; a mixer; etc.), an output device (e.g., a peripheral monitor; another touch screen display; an audio output device, such as a speaker; etc.), an external power source (e.g., a battery, etc.); a data storage device (e.g., a hard drive, an optical drive, etc.), an additional communication element (e.g., a USB port, a USB micro port, HDMI ports, a firewire interface, an i.LINK interface, a Lynx interface, an 8P8C jack, etc.) or the like. In various embodiments, the peripheral component 104 may also include a power supply (e.g., a battery, etc.) to provide power to its primary features.

Figure 4:
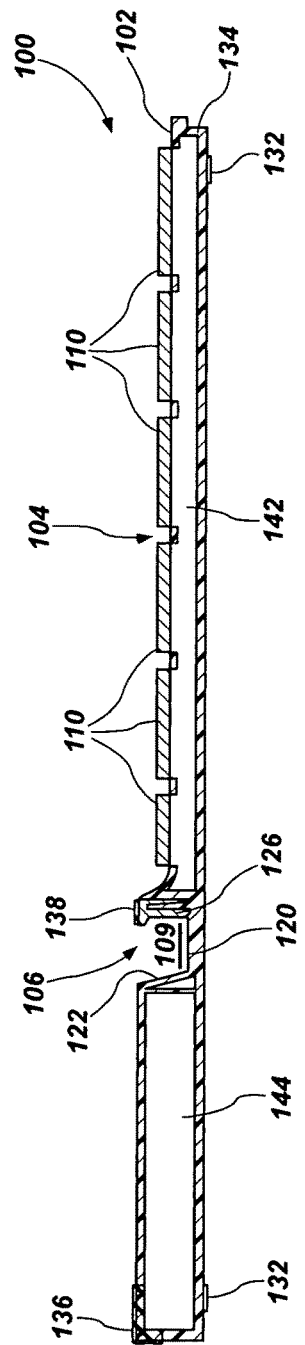
FIG. 4 is a side cross-sectional view of the accessory of FIG. 1, taken along line 4-4 of FIG. 2.

The housing 102, as best illustrated by FIG. 4, may include an interior that accommodates other elements of the accessory 100. The depicted embodiment of the housing 102 includes a front compartment 142 and a rear compartment 144. In embodiments where the peripheral component 104 comprises a keyboard, the keyboard and its various features (e.g., its circuit board, the bases of its keys 110, etc.) and, optionally, weights (which may position a center of gravity of the accessory 100 toward the front of the accessory 100 to counteract any tendency of an electronic device supported in an inclined orientation by the accessory 100 and its support element 106 to cause the accessory 100 to tilt backwards) and any other suitable components may be carried by the front compartment 142, while other associated components, such as a power supply (e.g., a battery, etc.), a communication component (e.g., a wireless transceiver, etc.) or the like may be carried by the rear compartment 144.

In the illustrated embodiment, the housing 102 is illustrated as containing portions of the peripheral component 104 (e.g., the base and circuitry of the depicted keyboard, etc.) while making other portions of the peripheral component 104 (e.g., the keys 110 of the depicted keyboard, etc.) accessible to an individual. Of course, a peripheral component 104 may be associated with the housing 102 of the accessory 100 in any other suitable manner as well (e.g., it may be fully contained by the housing 102; it may be attached to the housing 102; etc.). In embodiments where the peripheral component 104 comprises a keyboard, the keyboard may have any number of configurations. For instance, the keyboard may include any number of keys 110 arranged in any desired pattern or arrangement, and corresponding to any number of characters (e.g., letters, numbers, symbols, etc.) and/or functions (e.g., page up/down controls, volume controls, video controls, cut/copy/paste, power on/off, etc.). In the embodiment of peripheral component 104 illustrated by FIGS. 1-4, the keyboard includes a set of alphanumeric keys 110 of differing sizes in a QWERTY-style format, or layout, while also including various keys for directional input, functional controls, and the like. As will be appreciated, a keyboard embodiment of a peripheral component 104 may have any other suitable format, and may include keys 110 arranged in different patterns, having the same or different relative sizes, corresponding to different characters or functions than those depicted, and the like.

The peripheral component 104 of the accessory 100 may be configured to operate in connection with an electronic device. By way of illustration, the peripheral component 104 may communicate with an electronic device in any suitable manner. For instance, the accessory 100 may be configured to communicate with an electronic device through a wired connection (e.g., a USB cable or connector, a micro USB cable or connector, a serial cable or connector, a firewire cable or connector, Apple, Inc.'s 30-pin cable or connector, etc.) or it may have wireless capabilities (e.g., infrared, BLUETOOTH®, etc.). In embodiments where the peripheral component 104 of the accessory 100 comprises a keyboard, keystrokes entered at the keyboard may be conveyed to the electronic device for a suitable response (e.g., entry of text into a selected "box" or "window" of the electronic device, etc.).

Figure 1:
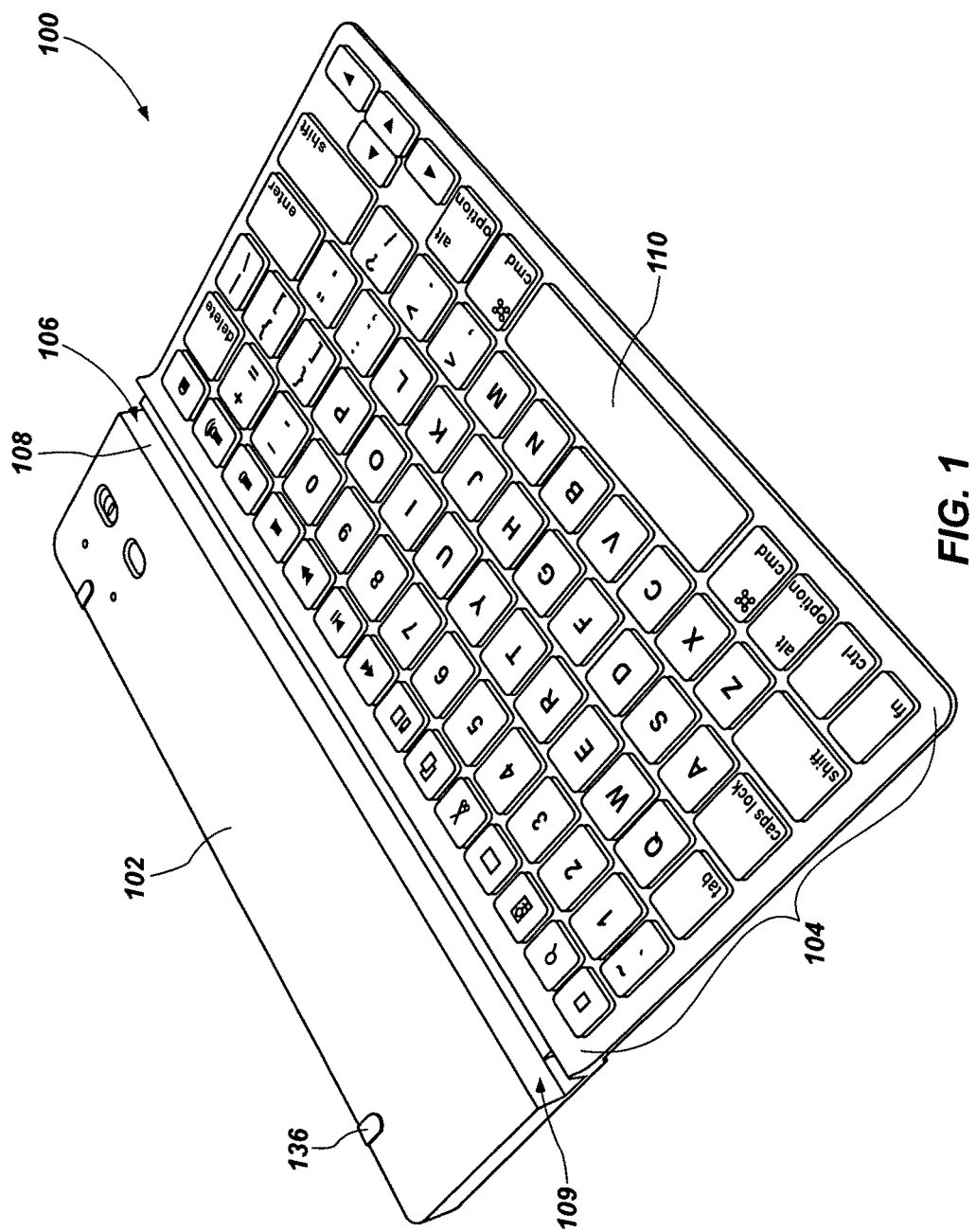
FIG. 1 is a perspective view of an embodiment of an accessory for an electronic device, with the depicted accessory including a keyboard.
Figure 2:
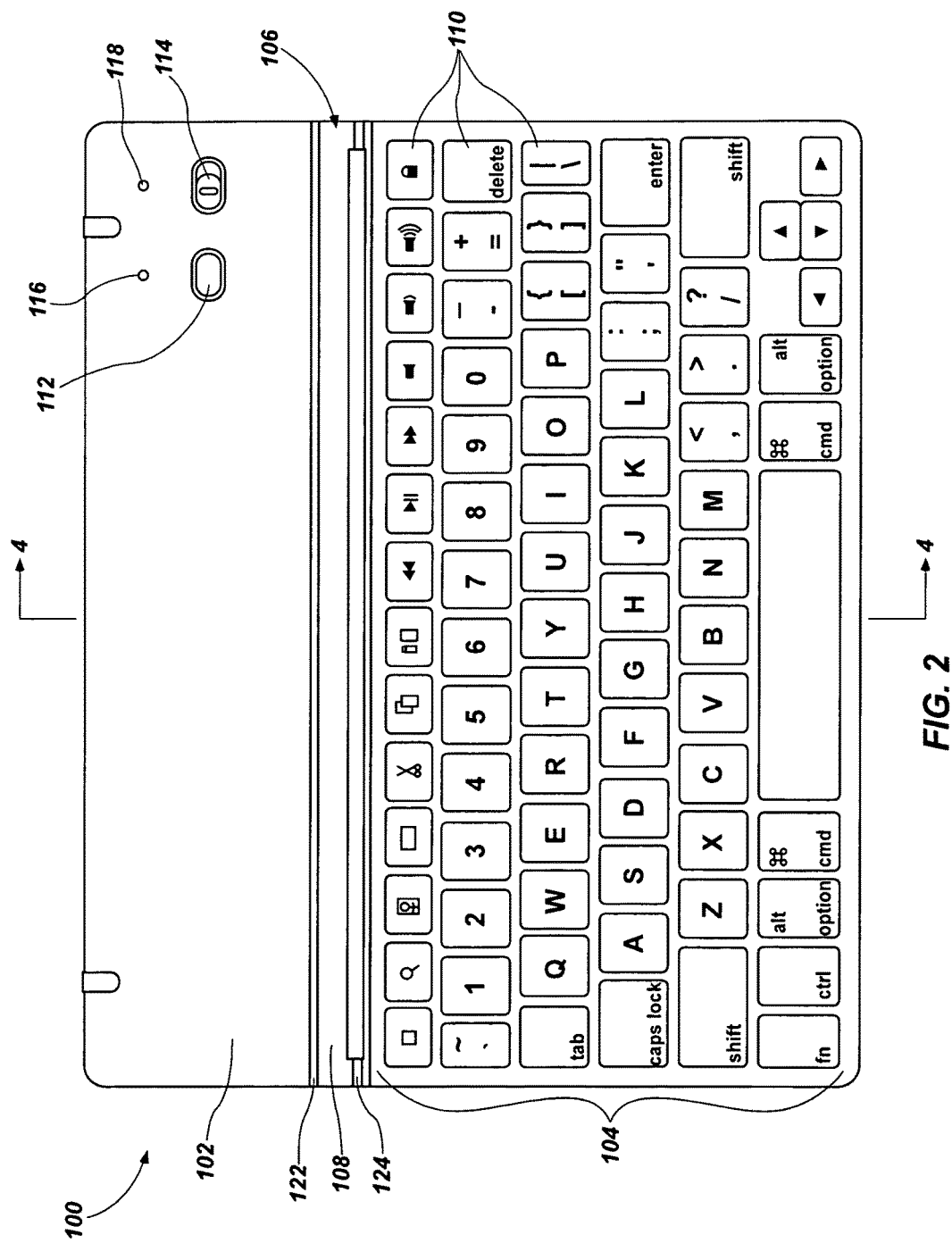
FIG. 2 is a top plan view of the accessory illustrated in FIG. 1.

As best illustrated by FIG. 2, an accessory 100 may include one or more control features 112, 114. In some embodiments, one control feature 114 is configured to power the peripheral component 104, while another control feature 112 may be configured to establish communication between the peripheral component 104 and an electronic device. In embodiments where the control feature 114 is configured to power the peripheral component 104 on or off, it can be a button or a switch. The control feature 114 may indicate whether or not the peripheral component 104 is powered on and, thus, may communicate with an electronic device. In embodiments where the other control feature 112 is configured to establish wireless communication between the peripheral component 104 and an electronic device, the control feature 112 may comprise a button that, when the peripheral component 104 and the electronic device are powered on, may wirelessly couple these devices to one another in a manner known in the art. In some embodiments, one or more status indicators 116, 118 may be used to provide an individual with an indication of a status of the accessory 100. As non-limiting examples, a status indicator 116, 118 may specify: whether the peripheral component 104 is powered on or off; whether or not the peripheral component 104 is coupled with, or connected to, an electronic device; the strength of connection to an electronic device; a type of connection with the electronic device; or the like. Each status indicator 116, 118 may include a light-emitting diode (LED), which may be configured to change between on and off states and/or between a plurality of different on states (e.g., which may be represented by different colors, steady and blinking states, blinking at different rates and or in different patterns, etc.).

In one example, a status indicator 118 may have one state (e.g., no light or color, etc.) when the peripheral component 104 is powered off. When the peripheral component 104 is powered on, the status indicator 118 may light up. Further, the status indicator 118 may light up in a first color when the peripheral component 104 is powered on, but one or more different colors during other activities (e.g., low battery warning, to indicate that the battery is charging, that the peripheral component 104 is in a standby mode, etc.).

In another example, when the peripheral component 104 is connected to an electronic device using a wired or wireless connection, the status indicator 116 may light up or otherwise indicate that a connection has been established. Depending on the type of connection, the color or manner in which the status indicator 116 operates may vary. For instance, if wired connection is made, the status indicator 116 may light up in a particular color. If a wireless connection is made, the status indicator 116 may light up in a different color. The state of the status indicator 116 may also vary based on other factors, such as the type of wireless connection.

With continued reference to FIGS. 1-4, the support element 106 of an accessory 100 is configured to be used in connection with an electronic device. The support element 106 may be configured for use with a particular type of electronic device (or electronic devices having a specific configuration and/or dimension(s)) or with electronic devices having a variety of different configurations and dimensions.

The support element 106 may be configured to orient an electronic device in a working arrangement, such as an inclined orientation, or an at least partially upright orientation, relative to the housing 102 of the accessory 100 (i.e., when a base of the housing 102 is placed on a horizontal or substantially horizontal support surface). The support element 106 may be positioned at a location relative to the remainder of the housing 102 that enables the housing 102 to stably support an electronic device as the electronic device is held in an inclined orientation. As shown, the support element 106 may be located off-center in relation to a depth of the housing 102 (i.e., the dimension from a front edge 134 of the housing 102 to a rear edge 140 of the housing 102), but well in front of the rear edge 140 of the housing 102, leaving a sufficient portion of the housing 102 to counter the effects of gravity on an electronic device supported in an inclined orientation by the support element 106 and the remainder of the accessory 100.

Figure 3:
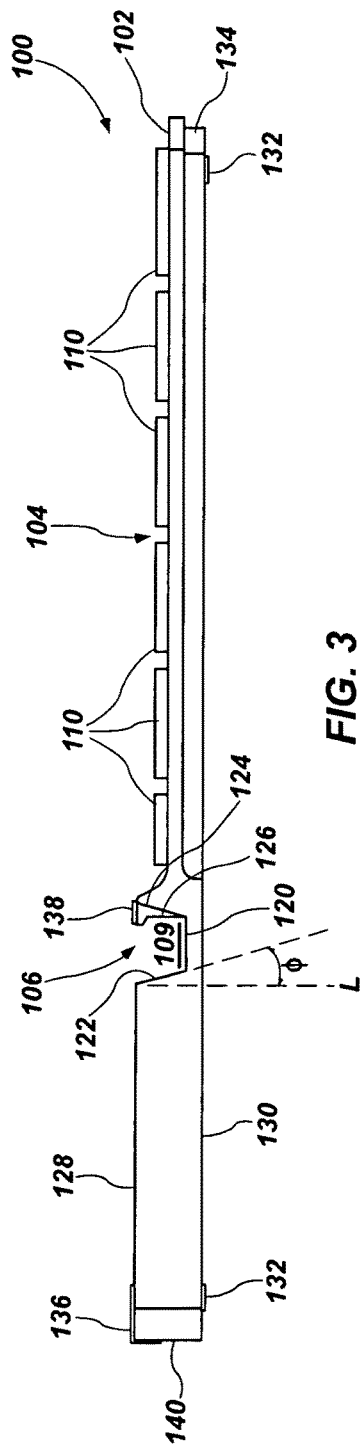
FIG. 3 is a side profile view of the accessory of FIG. 1.

The support element 106 may include an elongated recess 108, which may extend at least partially across a width of the housing 102. More particularly, the elongated recess 108 may comprise a groove or a channel 109 in an upper surface of the housing 102. As best illustrated in FIGS. 3 and 4, the groove or channel 109 may be defined by various surfaces of the housing 102. In the illustrated embodiment, a base surface 120, which is recessed relative to a top surface 128 of the housing 102 and which may be oriented generally parallel to a top surface 128 and/or a base surface 130 of the housing 102, defines a lower extent of the groove or channel 109. The groove or channel 109 may also include front and rear surfaces 124 and 122, respectively, which may be oriented transverse to the base surface 120. A width of the groove or channel 109 (e.g., a distance between the front surface 124 and the rear surface 122, etc.) may accommodate the width of a portion of an electronic device to be inserted therein.

In at least one embodiment, the groove or channel 109 is open at the top surface 128 of the housing 102. Of course, a depth of the groove or channel 109 may be less than a thickness of the housing 102. Accordingly, the base surface 120 of the groove or channel 109 may be at least partially offset from the base surface 130 of the housing 102. In various embodiments, the groove or channel 109 may extend only slightly into the housing 102, or it may extend substantially through the housing 102. For instance, the groove or channel 109 may extend through the accessory 100 to a base of the housing 102 (e.g., the upper surface of a substantially planar element that forms the base surface 130 of the housing 102).

In other embodiments, a groove or channel 109 may extend completely through the housing 102 and, thus, lack a base surface 120.

In a specific embodiment, the groove or channel 109 may have a depth of about one-eighth inch (about 3.17 mm) to about three-quarters inch (about 19.05 mm) deep, and has a width that is approximately one-hundred percent to about two-hundred percent of the width of an electronic device 150 (FIGS. 5A-7) that may be supported by the support element 106 and the remainder of the accessory 100. The width of the groove or channel 109 at its base surface 120 may be about one-quarter inch (about 6.35 mm) to about three-quarters inch (about 19.05 mm). The groove or channel 109 may be sized and configured to enable an electronic device 150 to be inclined and to create a leverage to selectively and removably secure the electronic device 150 in place relative to the accessory 100.

In some embodiments, a relatively wide groove or channel 109 may be configured to receive one or more inserts 127 (see FIG. 5B.) to accommodate relatively thin portions of electronic devices. Such an insert 127 may effectively decrease the width of the groove or channel 109 and, in some embodiments, effectively change the angle at which the groove or channel 109 orients an electronic device.

In addition to including a groove or channel 109 with front and rear surfaces 124 and 122, respectively, a support element 106 of an accessory 100 may include other features (e.g., lips, ridges, grooves, other wall features (e.g., curvatures, undulations, other non-planar configurations, etc.), coatings, etc.) that may at least partially support and/or engage an edge portion of an electronic device 150 (FIGS. 5A-7). As a non-limiting example, a lip or overhang may extend from a front of the groove or channel 109 (e.g., from the front surface 124, from a location laterally adjacent to the front surface 124, from a location above the front surface 124, etc.), over a portion of the groove or channel 109. In some embodiments, such as that depicted by FIGS. 3 and 4, the lip or overhang may be defined by an insert 127, which may be provided along and cover part of or all of the front surface 124 of the groove or channel 109. A surface of the insert 127 (FIG. 5B) that faces the groove or channel 109 may define a second front surface 126 of the groove or channel 109. Although the drawings depict the lip or overhang as being defined by an insert 127, it may be formed as part of the groove or channel 109, any other embodiment of an elongated recess or any other embodiment of a support element 106.

The support element 106 may, in accordance with some embodiments of the present disclosure, be configured to support an electronic device 150 (see FIG. 5A) at an inclined angle relative to the housing 102. For instance, in FIGS. 3 and 4, the rear surface 122 of the groove or channel 109 is oriented at an obtuse angle. More particularly, the rear surface 122 may be oriented at an angle φ relative to a line L (see FIG. 3). The line L of the illustrated embodiment is about normal to the base surface 130 of the accessory 100, and to the base surface 120 of the support element 106, although the angle φ may be defined with respect to any particular line or plane. Regardless of the manner in which the angle φ is defined, the degree of the angle φ may vary as desired. For instance, in some embodiments, the angle φ may be about zero and the rear surface 122 and/or the groove or channel 109 may be about perpendicular to the base 130 of the accessory 100 and/or the base surface 120 of the support element 106. In other embodiments, the angle φ may be larger than zero. By way of illustration and not by way of limitation, the angle φ may be greater than zero degrees up to about sixty degrees.

The cross-sectional shape of the groove or channel 109 may vary based on the relative orientations of its surfaces 120, 122 and 124 and, optionally, 126. Indeed, in some embodiments, such as those illustrated in FIGS. 1-4, the shape of the groove or channel 109 optionally varies along a length of the groove or channel 109. For instance, at one or more locations, the cross-sectional shape of the groove or channel 109 may be defined by the base surface 120, the rear surface 122, and the front surface 124, while the cross-sectional shape at one or more other locations of the groove or channel 109 may be defined by the base surface 120, the rear surface 122 and the second front surface 126 of an insert 127 or similarly configured feature.

The front surface(s) 124, 126 of the groove or channel 109 may optionally be oriented at an angle relative to the line L, the base surface 120, the base surface 130, or some other reference line or plane. In some embodiments, for instance, the front surface(s) 124, 126 may be oriented parallel or substantially parallel to the rear surface 122 of the groove or channel 109. In such an embodiment, the groove or channel 109 may have a somewhat parallelogram-shaped cross-section. In FIG. 3, a cross-sectional shape of the groove or channel 109 may be generally trapezoidal. For instance, the rear surface 122 and the front surface(s) 124, 126 may be oriented non-parallel to one another, while the base surface 120 of the groove or channel 109 and the top surface 128 of the housing 102 may be parallel or substantially parallel to one another. In embodiments where the groove or channel 109 includes two or more front surfaces 124 and 126, those front surfaces 124 and 126 may be oriented at different angles. For instance, in one embodiment, the base surface 120 and front surface 124 may define an obtuse angle, while the front surface 126 and the base surface 120 may be oriented perpendicular to one another. Thus, in some embodiments, a second front surface 126 may be parallel or substantially parallel to the line L.

In addition to the peripheral component 104 and the support element 106, the housing 102 of the accessory 100 may carry any number of additional components or features. In one embodiment, shown in FIGS. 3 and 4, protective pads 132 may be positioned on the base surface 130 of the housing 102 of the accessory 100. The protective pads 132 may have any suitable configuration to protect the base surface 130 of the accessory 100, to protect a surface (e.g., a desktop, a tabletop, etc.) that supports the accessory 100, and/or to engage (e.g., frictionally, by releasable adhesion, etc.) a surface that supports the accessory 100.

An accessory 100 may also include one or more retention structures 134 to enable assembly of the accessory 100 with, and its retention by, another complementary apparatus (e.g., a protective case, a folio, etc.) or structure. In FIGS. 3 and 4, for instance, the depicted embodiment of retention structure 134 includes a groove, slot, detent, or other structure formed adjacent to side edges of the housing 102, although a retention structure 134 may be located at any suitable location.

Still other optional features of an accessory 100 may be configured to protect an electronic device 150 (FIGS. 5A-7A) with which the accessory 100 is configured to be used, such as the depicted protective elements 136 and 138. In the depicted embodiments, the protective elements 136 and 138 are positioned at various locations on the top surface 128 of the housing 102. More specifically, the protective element(s) 136 may be positioned at or near the rear edge 140 of the housing 102, while the protective element(s) 138 may be positioned atop an insert 127 located adjacent to the front surface 124 of the groove or channel 109. Of course, protective elements 136 and 138 may be positioned at one or more alternate or additional locations. As an alternative to the depicted embodiment, in which the protective elements 136 and 138 are distinct elements that are secured to other features of the housing 102, protective elements 136 and 138 may be integrally formed with other elements of the housing 102. For instance, a protective element 136, 138 may comprise part of or all of the top surface 128 of the housing 102.

Protective elements 136 and 138 are useful in embodiments where the top surface 128 of the housing 102 is configured to be occasionally positioned against a surface of an electronic device 150 (FIGS. 5A-7). Such an arrangement of the accessory 100 and an electronic device 150 may occur where the electronic device 150 is stored with the accessory 100.

The protective elements 136 and 138 may be formed of a material configured to reduce a risk of damage to the display, housing, or other elements of an electronic device 150 (FIGS. 5A-7). For instance, the protective elements 136 and 138 may protrude from the top surface 128 of the housing 102 and cushion surfaces of an electronic device 150 positioned on the top surface 128. The protective elements 136 and 138 may be configured to absorb a shock generated by impact on the electronic device 150 or the accessory 100. In some embodiments, each protective element 136, 138 may comprise a compressible, resilient material. Examples of such materials include, but are not limited to, ethylene-vinyl acetate (EVA) foam (which is commonly referred to as "foam rubber" and as "expanded rubber"), polyurethane foam (e.g., microcellular polyurethane foam; fine-celled, low compression-set, high density polyurethane foam; etc.), neoprene and a variety of other materials having desired characteristics.

Figure 6:
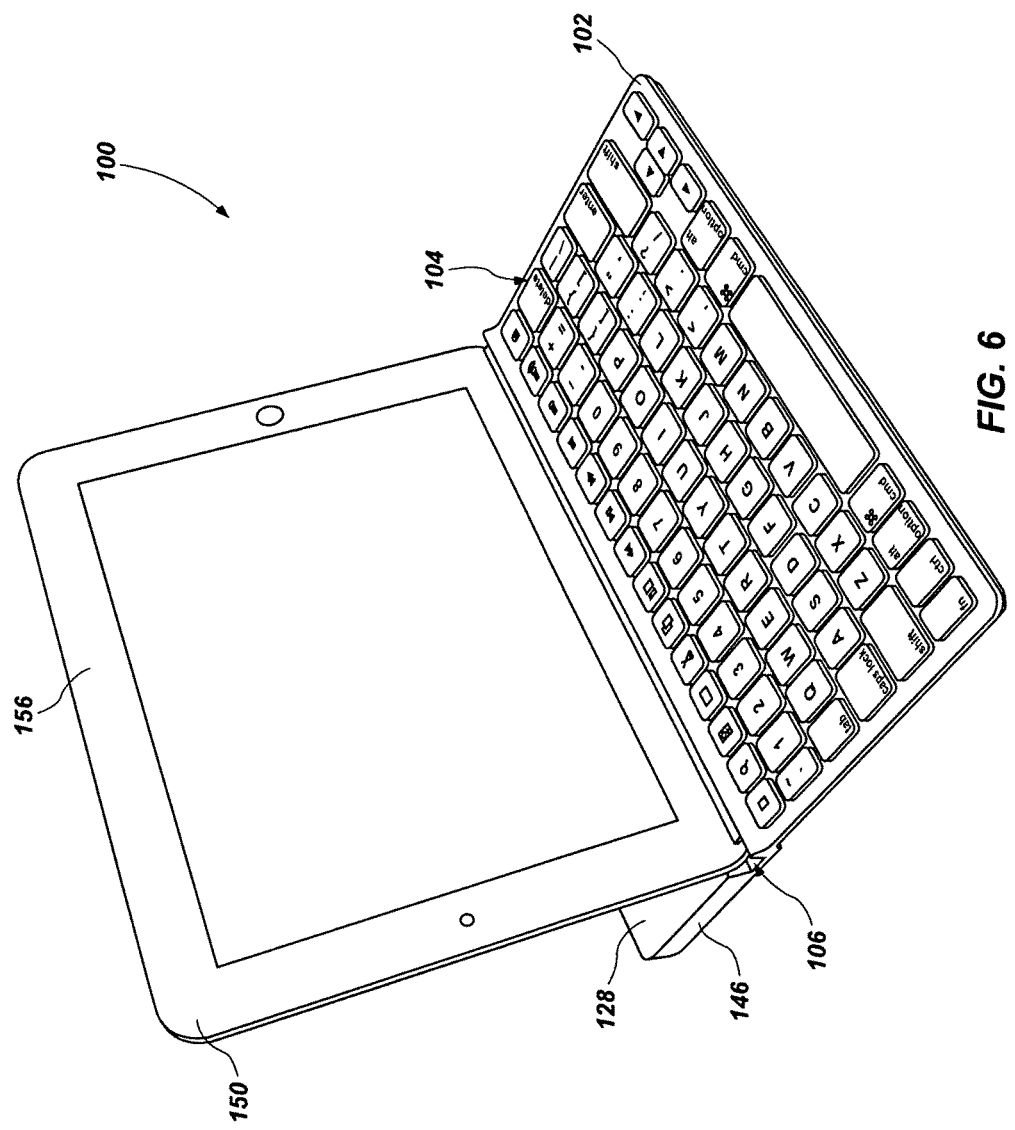
FIG. 6 is a perspective view of an embodiment of an accessory supporting an electronic device that has been placed in a landscape orientation.
Figure 7:
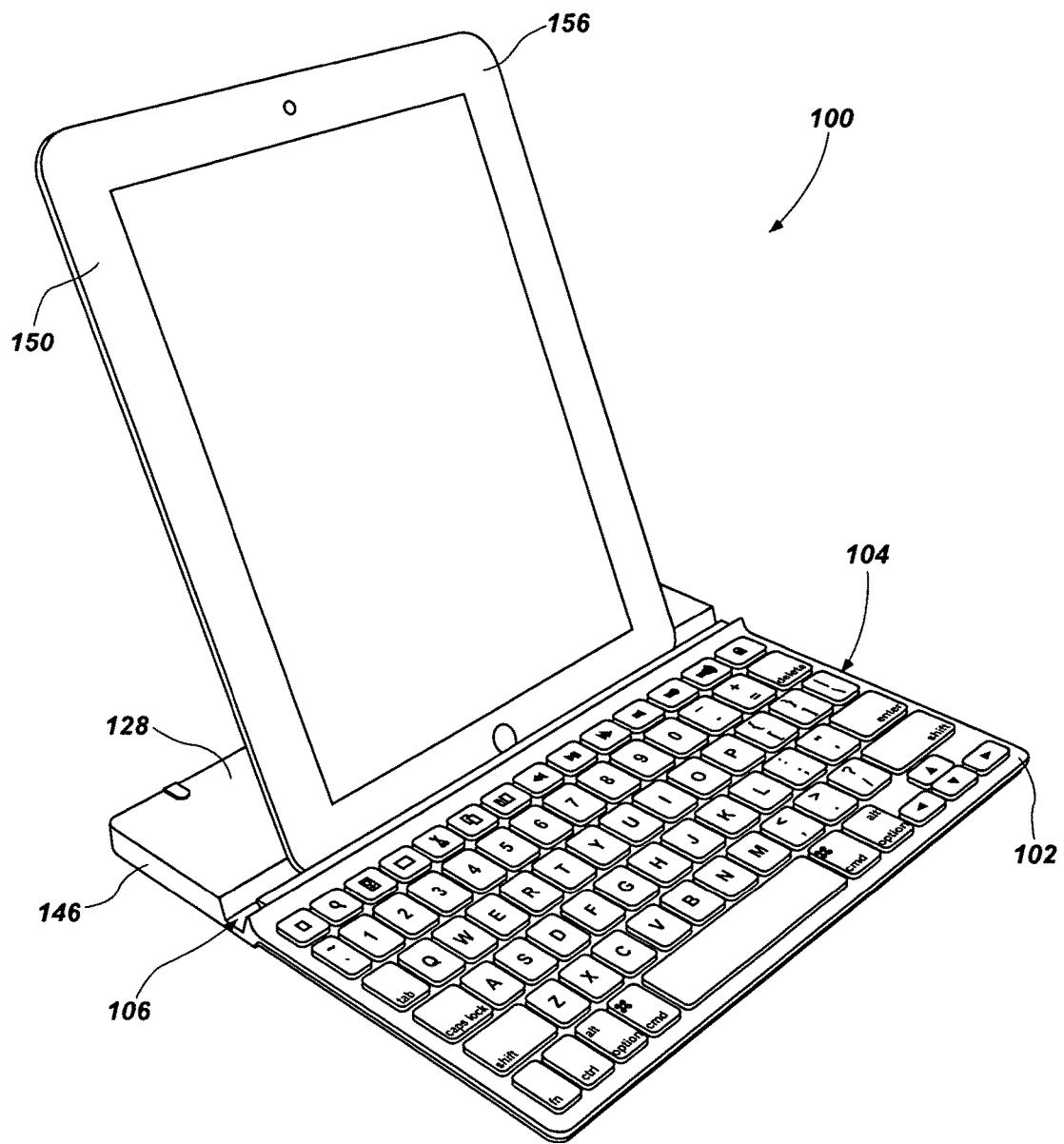
FIG. 7 is a perspective view of an embodiment of an accessory supporting an electronic device that has been placed in a portrait orientation.

As disclosed previously herein, the support element 106 of an accessory 100 is configured to orient an electronic device 150 in a working arrangement. FIGS. 5A-7 illustrate various views of an embodiment of accessory 100 supporting an electronic device 150 in an inclined, or at least partially upright, working arrangement. The portable electronic device 150 may be positioned in a landscape orientation, as shown in FIGS. 5 and 6, or in a portrait orientation, as illustrated by FIG. 7.

The accessory 100 and its housing 102 and support element 106 may be configured to support a single type of electronic device 150 or a plurality of different types (and shapes and sizes) of electronic devices 150. Without limitation, the accessory 100 may be configured for use with a portable electronic device 150, such as a so-called "tablet" or "slate" computer, a smart phone, an e-reader or other mobile computing devices or the like. Examples of tablet computers that may be used with an accessory 100 include, but are not limited to the IPAD® available from Apple Inc., the Motorola Mobility, Inc.'s XOOM™, the BLACK-BERRY PLAYBOOK™ from Research in Motion Limited, the STREAK™ available from Dell Inc., and Hewlett-Packard Co.'s TOUCHPAD™, among others. An accessory 100 may be configured for use with virtually any smart phone, including, without limitation, Apple, Inc.'s IPHONE®s, the Samsung GALAXY®, and Research In Motion Limited's BLACKBERRY® phones. Among the various types of e-readers and other mobile computing devices with which an accessory 100 may be used are the IPOD TOUCH® available from Apple Inc., the KINDLE® available from Amazon Technologies, Inc., the NOOK™ available from Barnes & Noble, Inc., the DS™ available from Nintendo Co., Ltd., and the like.

FIGS. 5A and 5B show an embodiment of the manner in which a support element 106 may support an electronic device 150 in an at least partially upright position. An edge portion 152 of the electronic device 150 may be assembled with the support element 106, such as by inserting the edge portion 152 into a groove or channel 109 of the support element 106. Once the edge portion 152 of the electronic device 150 has been inserted into the groove or channel 109, the electronic device 150 may be rotated about the edge portion 152 through the angle θ (e.g., an opposite edge of the electronic device 150 may be moved toward a rear 140 of the housing 102, etc.) to the illustrated inclined orientation. As indicated previously herein, the groove or channel 109 may be configured to orient the electronic device 150 at one or more inclined angles relative to the housing 102 of the accessory 100. For instance, the rear surface 122 and/or the front surface 124, 126 of the groove or channel 109, an insert 127 in the groove or channel 109 and/or any other feature associated with the groove or channel 109 may be configured (e.g., oriented at an angle, etc.) to orient the electronic device 150 at a desired angle (e.g., a non-parallel and non-perpendicular angle, a perpendicular angle, etc.) to one or both of the base surface 120 of the groove or channel 109 and the base surface 130 of the housing 102. The phantom lines in FIG. 5A depict an embodiment where the electronic device 150 may be supported perpendicularly relative to the housing 102. In other embodiments, the electronic device 150 may be oriented at a non-perpendicular angle. In FIG. 5A, the angle θ defines an angle at which the electronic device 150 is offset from a vertical, upright, or other orientation. The angle θ may measure an angle between the electronic device 150 and a line that is about normal relative to a cross-sectional length of the housing 102. The magnitude of the angle θ may vary as desired. For instance, and without limitation, the angle θ varies between about zero and about sixty degrees.

In such an orientation, leverage or some other mechanical advantage may limit further rotation of the electronic device 150 and, in some embodiments, at least partially secure the edge portion 152 of the electronic device 150 in the groove or channel 109. More particularly, to create such leverage, the housing 102 may be configured to provide two or more offset contacts. In the embodiment in FIG. 5A, such contacts may correspond to locations along both a front surface 156 and rear surface 158 of the portable electronic device 150. For instance, the rear surface 158 may contact the angled rear surface 122 of the groove or channel 109. Such contact may occur at a point, at one or more points, or substantially continually along a contact axis or surface extending laterally along all or a portion of the width (i.e., into the page) of the housing 102. The contact is represented by reference A and is, in this embodiment, located at or near a junction between a top surface 128 of the housing 102 and the rear surface 122 of the groove or channel 109. A second contact may be present and in this embodiment is represented by reference B. Contact B may exist at one or more points, along an axis or plane, or in another manner, and can be located at the front surface 124, 126 of the groove or channel 109. More particularly, in the illustrated embodiment, contact B may be at a location at or near a junction between the base surface 120 and the front surface 124, 126 of the groove or channel 109. Contact B may, of course, be longitudinally offset (relative to a height, or thickness, of the housing 102) from the top surface 128 of the housing 102 and located at or near the base surface 120 of the groove or channel 109. Contact B is optionally nearer the peripheral component 104 than contact A, although such an embodiment is not limiting. Accordingly, in some embodiments, contacts A and B may be offset in at least two directions (e.g., horizontally and vertically in the orientation shown in FIG. 5A, etc.). Additionally, while only two contacts are specifically described, the electronic device 150 may engage the support element 106 at more than two points, along more than two axes, along one or more planar or other surfaces, or in any number of other manners that enable the housing 102 and the support element 106 to support the electronic device 150 in an inclined orientation.

Sufficient leverage may also be created in a number of other ways. In embodiments where the support element 106 includes a lip or overhang extending laterally over a front edge of the groove or channel 109, such as that shown in FIG. 5B, a rear surface 158 of the electronic device 150 may contact the support element 106 at a contact A. To create or maintain a leveraged state, at least one other edge or corner of the edge portion 152 of the electronic device 150 may engage the support element 106 at one or more other locations. In the illustrated embodiment, the front surface 156 of the electronic device 150 may engage the front surface 126 of the groove or channel 109 at contact C. Another contact D may be made between a location on the front surface 156 of the electronic device 150 and an underside or corner of the lip or overhang. As will be appreciated, contacts A, C and D may be offset in two or more dimensions. For instance, relative to the side view illustrated in FIG. 5B, contact C is offset vertically downward and to the right of contacts A and D. Contact D may also be offset vertically downward and to the right of contact A, although not to the same degree as contact C in this particular embodiment. The degree of offset may be used to maintain the electronic device 150 in a leveraged state that enables the electronic device 150 to remain securely in place without tipping.

As is already apparent from the foregoing, the groove or channel 109 or any other embodiment of support element 106 may create sufficient leverage to support the electronic device 150 in an inclined orientation. The leverage created by the support element 106 may be sufficient to support the electronic device 150 in the absence of support from additional or supplemental apparatuses. For instance, the support element 106 may create enough leverage at the edge portion 152 of the electronic device 150 to maintain the electronic device 150 in the illustrated working arrangement even absent utilization of a stand or an external (to the accessory 100) support (e.g., a counterweight, etc.).

Figure 8:
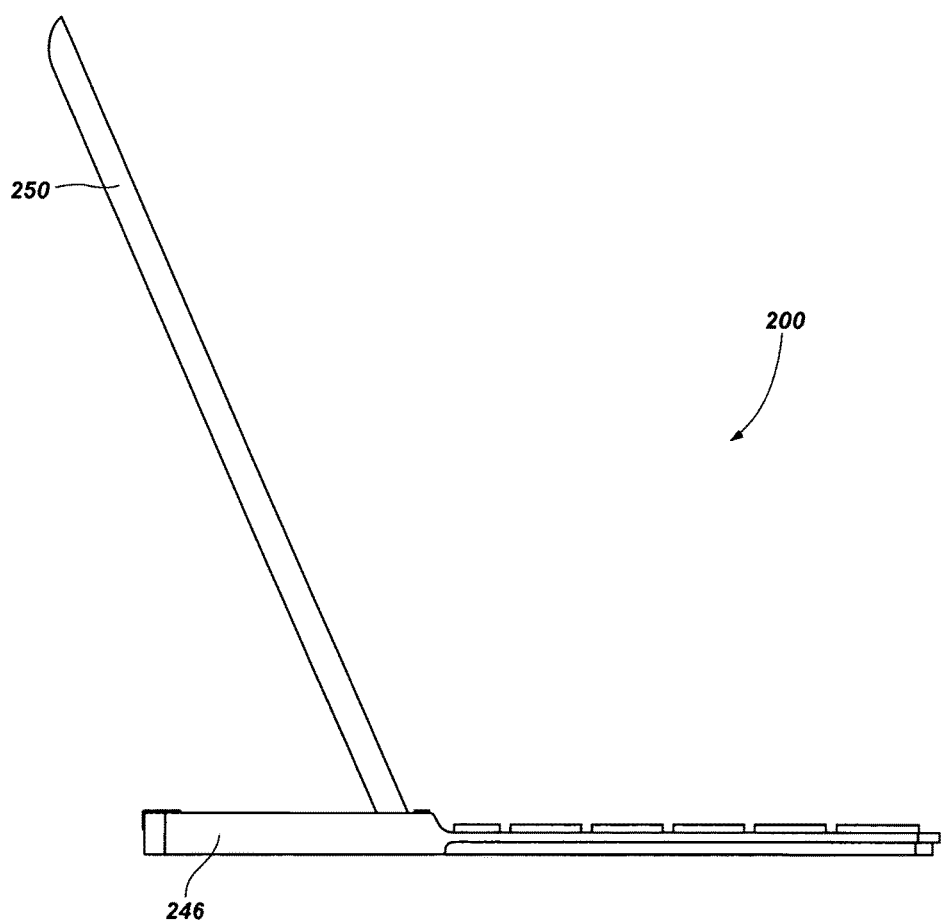
FIG. 8 is a side view of another embodiment of an accessory a support element of which includes an elongated recess with closed ends.

FIG. 8 depicts an embodiment of accessory 200 in which a support element 106 (FIGS. 1-7) includes a groove or channel 109 (FIGS. 1-7) with at least one closed end. As an electronic device 250 is positioned within the groove or channel 109, a side 246 of the accessory 200, which closes off an end of the groove or channel 109, may prevent lateral sliding of the electronic device 250 beyond the side 246. Such a configuration may prevent at least some inadvertent disassembly of the electronic device 250 from the accessory 200.

Figure 9:
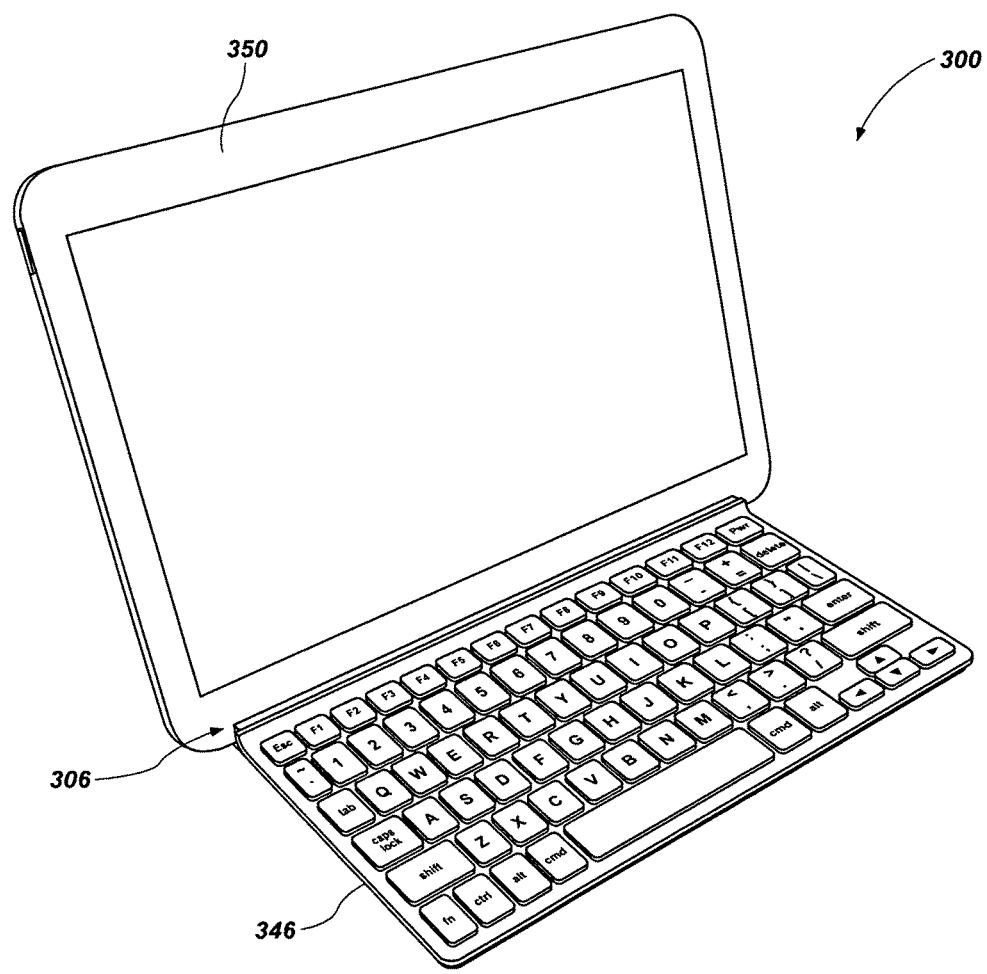
FIG. 9 is a perspective view that illustrates an embodiment of an accessory with a support element comprising an elongated recess with open ends, and showing an embodiment of electronic device supported by the accessory in a landscape orientation.
Figure 10:
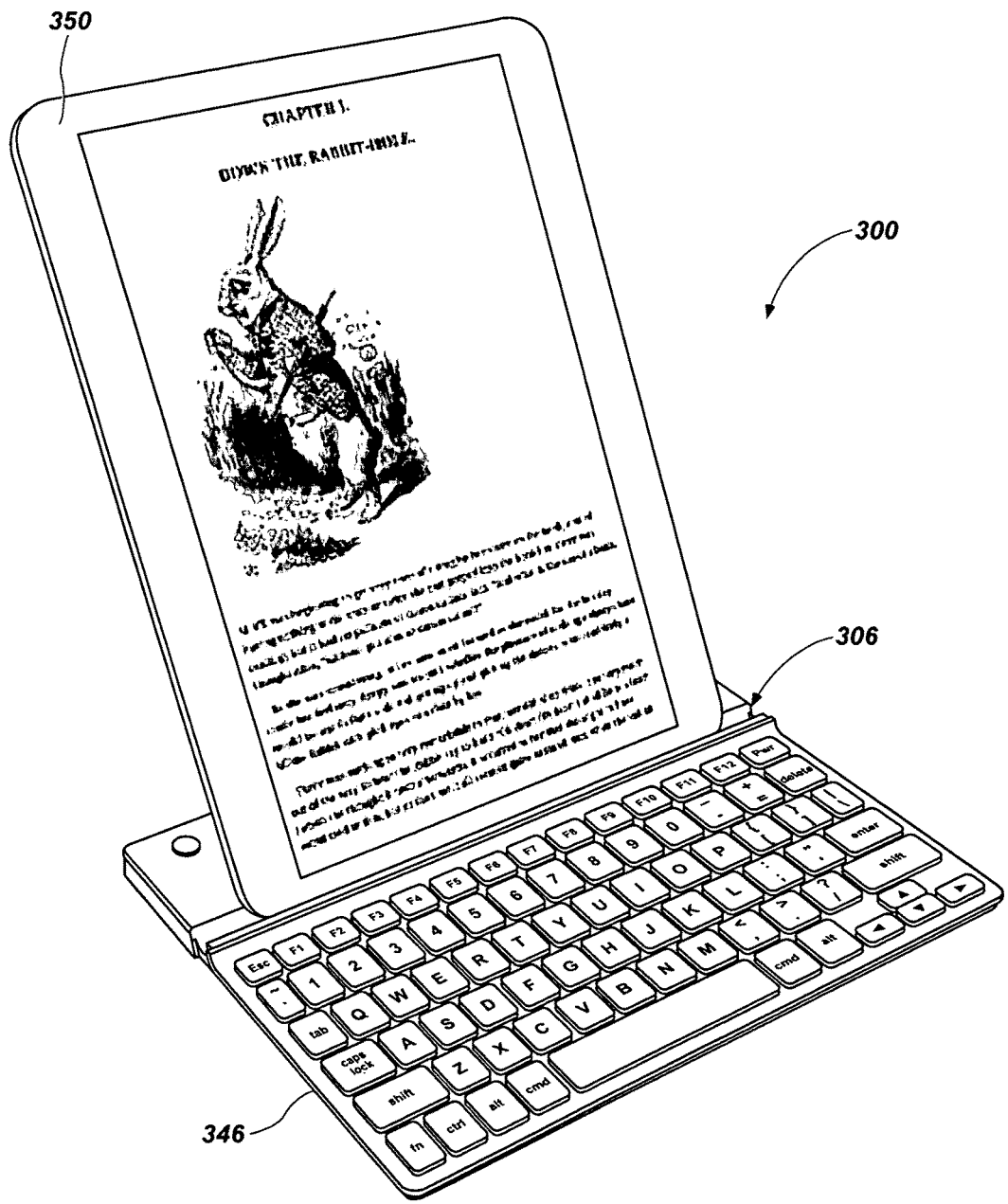
FIG. 10 is another perspective view of the embodiment of accessory shown in FIG. 9, supporting an electronic device in a portrait orientation.

Turning now to FIGS. 9 and 10, another embodiment of an accessory 300 is illustrated. The accessory 300 may include features similar to those discussed above relative to accessories 100 and 200. As shown the accessory 300 may have a width that is about the same as or smaller than a width and/or height of an electronic device 350 with which the accessory 300 is configured to be used. Thus, when assembled with and supported by the accessory 300 and its support element 306, the electronic device 350 may extend laterally beyond one or both sides 346 of the accessory 300. To enable the accessory 300 to accommodate an electronic device 350 with such dimensions, one or both of the ends of the support element 306 may be open. In such an embodiment, the electronic device 350 may extend to a location laterally beyond the lateral ends of the support element 306 and the side surfaces 346 of the accessory 300 while being engaged by the support element 306.

Additional or other features may also be utilized to extend the number of electronic devices with which an accessory according to the present disclosure may be used. In this regard, FIGS. 11-13 illustrate an embodiment of an accessory 400 that is configured to support electronic devices of a variety of different thicknesses.

Figure 11:
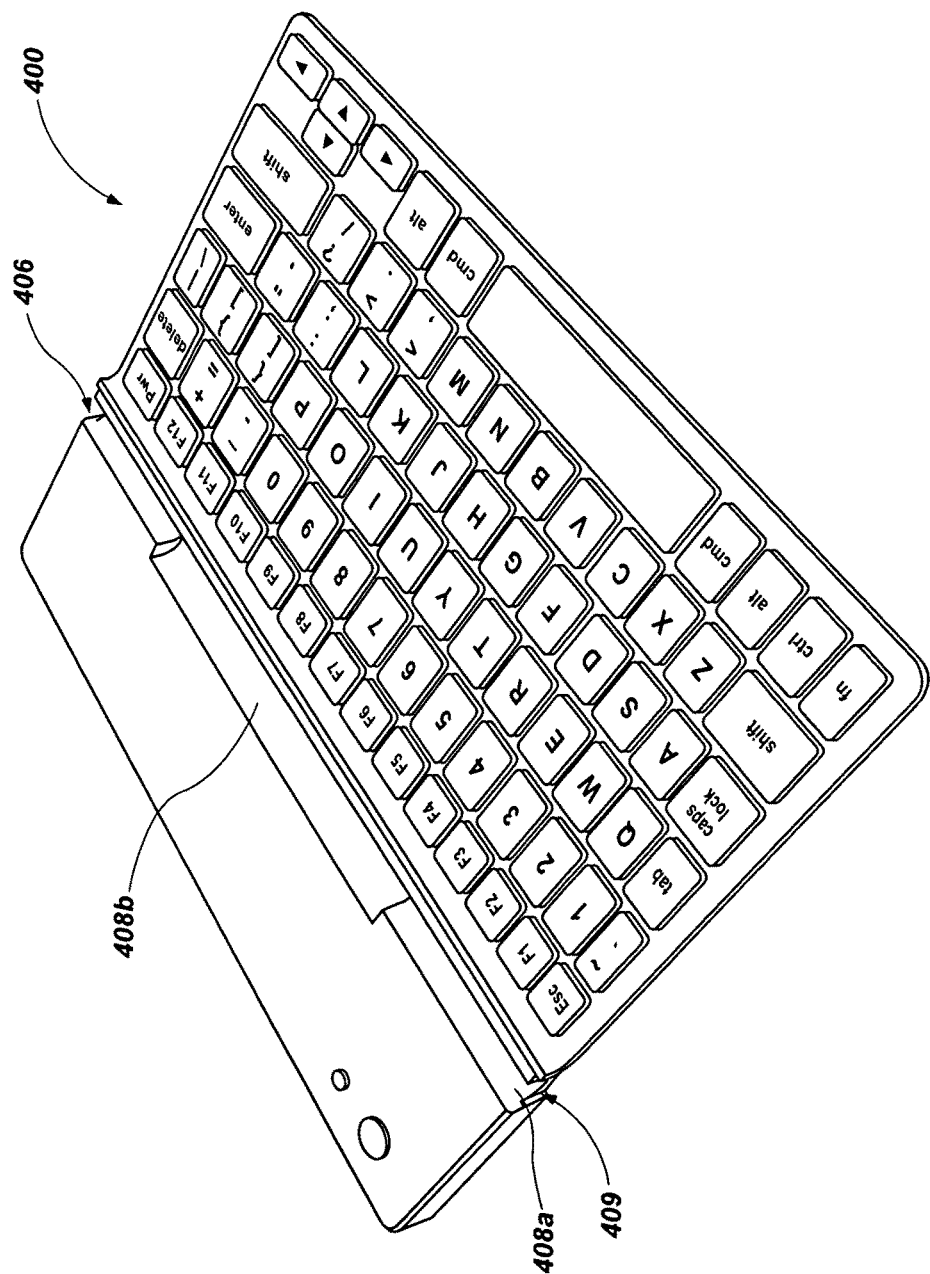
FIG. 11 is a perspective view of yet another embodiment of an accessory, which includes a support element configured to support devices of a plurality of different sizes.

With reference to FIG. 11, the accessory 400 includes a support element 406 that includes an elongated recess 409 with regions 408a and 408b of different widths. More specifically, a wide region 408b may be located between two narrow regions 408a. With this arrangement, regions 408a, along with region 408b, may accommodate a relatively large but thin electronic device, while region 408b may accommodate a relatively thick but small electronic device. Even more specifically, regions 408a and 408b together may accommodate an electronic device having a width and/or height that is larger than the length of region 408b and a thickness that is less than the width(s) of region(s) 408a, while region 408b alone may accommodate an electronic device that is thicker than the width(s) of region(s) 408a but has a width or height that is smaller than the length of region 408b.

Figure 12:
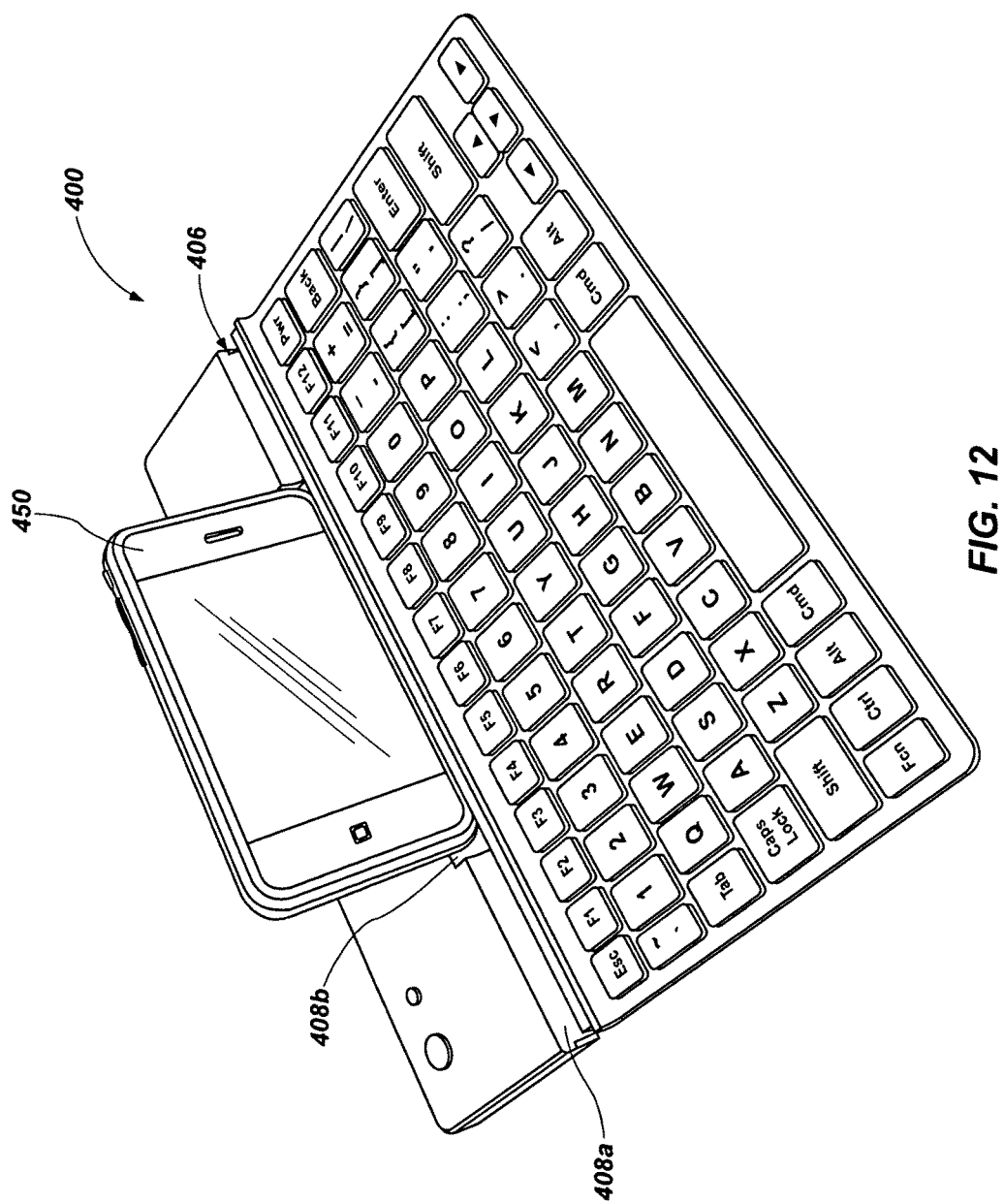
FIG. 12 is a perspective view of the accessory of FIG. 11 supporting another embodiment of electronic device positioned in a landscape orientation.
Figure 13:
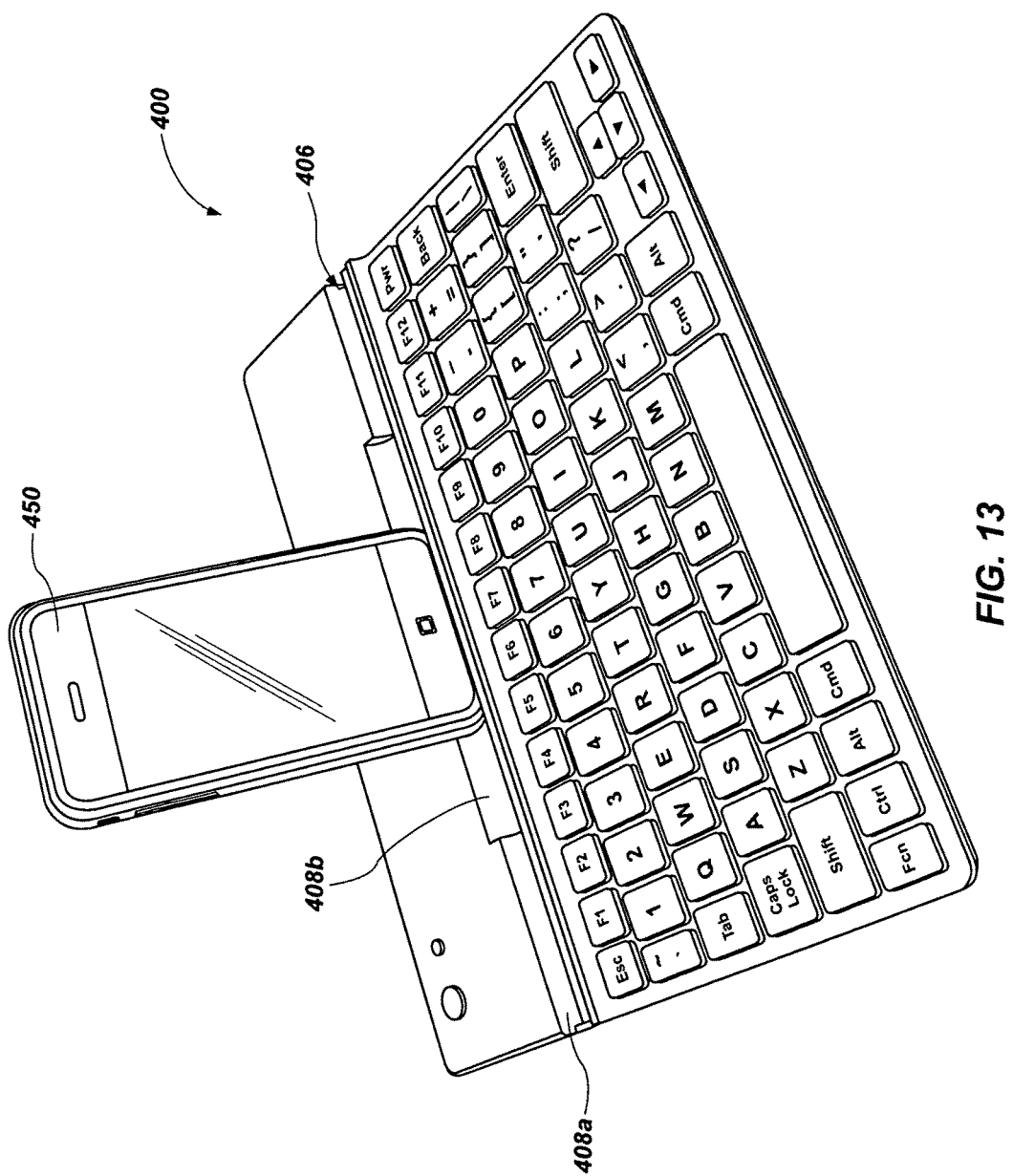
FIG. 13 is a perspective view of the accessory of FIG. 11 supporting the electronic device in a portrait orientation.

FIGS. 12 and 13 depict an example of an electronic device 450 that is too thick to be inserted into regions 408a or that has a thickness that may prevent it from fitting easily within regions 408a, but nonetheless may be accommodated by region 408b. As illustrated, region 408b may be long enough to accommodate the electronic device 450 while in a landscape orientation (FIG. 12) or in a portrait orientation (FIG. 13). In other embodiments, the length of region 408b may be tailored to prevent thicker electronic devices 450 (e.g., electronic devices with thicknesses that exceed the width(s) of region(s) 408a, etc.) from being supported in a landscape orientation. Alternatively, a longer wide region 408b may accommodate a wider variety of electronic devices.

Although the wide region 408b is illustrated as intersecting the narrow region 408a in such a way that the elongated recess 409 includes multiple regions of different dimensions, it should be appreciated that such an embodiment is merely exemplary. In other embodiments, a series of two or more generally parallel, but non-intersecting channels may be used for multiple, different portable electronic devices.

Although the foregoing description contains many specifics, these should not be construed as limiting the scope of any of the appended claims, but merely as providing information pertinent to some specific embodiments that may fall within the scopes of the appended claims. Features from different embodiments may be employed in combination. In addition, other embodiments of the present disclosure may also be devised which lie within the scopes of the disclosure and the appended claims. The scopes of the claims are, therefore, indicated and limited only by the language used therein and the legal equivalents to the elements of the appended claims. All additions, deletions and modifications that fall within the meaning and scopes of the appended claims are to be embraced thereby.

What is claimed:

1. An accessory for an electronic device, comprising:
a housing with an upper surface, the housing including:
a support element comprising:
an elongated recess within the upper surface of the housing and extending at least partially across a width of the housing, the elongated recess comprising:
a front surface;
a base;
a rear surface; and
a rear corner at a junction between the rear surface of the elongated recess and the upper surface of the housing; and
at least one lip protruding beyond the front surface of the support element,
a recessed area defined by the at least one lip, the front surface of the support element, and the base of the support element, the support element capable of receiving an edge portion of the electronic device, of holding the electronic device in an inclined orientation and, along with the housing, of supporting the electronic device in the inclined orientation with an edge of the electronic device resting upon at least a portion of the base of the support element, a back surface of the edge portion of the electronic device resting upon at least a portion of the rear corner of the support element, and a front surface of the edge portion of the electronic device being disposed against a protruding portion of the at least one lip.

2. The accessory of claim 1, wherein the housing is configured to impart the accessory with portability.

3. The accessory of claim 1, wherein the housing has a thickness of about 0.375 inch or less.

4. The accessory of claim 1, wherein the housing has a thickness of about one centimeter or less.

5. The accessory of claim 1, wherein the support element extends completely across the width of the housing.

6. The accessory of claim 5, wherein ends of the support element open to opposite sides of the housing.

7. The accessory of claim 1, wherein the rear surface of the elongated recess of the support element is oriented at an obtuse angle relative to the base of the support element.

8. The accessory of claim 1, wherein the rear surface of the elongated recess of the support element is oriented at an obtuse angle relative to the base of the support element.

9. The accessory of claim 1, wherein the support element includes a plurality of regions configured for use with electronic devices of different widths.

10. The accessory of claim 1, wherein the support element and the housing are configured to completely support the electronic device in the inclined orientation.

11. The accessory of claim 1, further comprising:
a peripheral component carried by the housing.

12. The accessory of claim 11, wherein the peripheral component comprises a user interface accessible from the top surface of the housing.

13. The accessory of claim 12, wherein the user interface comprises a keyboard.

14. The accessory of claim 1, wherein the housing is configured for assembly with another accessory.

15. The accessory of claim 14, wherein the housing is configured for assembly with a folio or a case for the electronic device.

16. The accessory of claim 1, wherein the top surface of the housing is configured to be disposed against a display of the electronic device.

17. A method for enhancing functionality of an electronic device, comprising:
inserting an edge portion of an electronic device into an elongated recess of a support element formed in an upper surface of an accessory to physically secure the electronic device in an inclined orientation relative to the accessory, wherein, upon inserting the edge portion of the electronic device into the support element, an edge of the electronic device rests upon at least a portion of a base of the support element, a back surface of the edge portion of the electronic device rests upon at least a portion of a rear corner of the support element defined at a junction between a rear surface of the support element and the upper surface of the accessory, and a front surface of the edge portion of the electronic device is disposed against a lip extending over a front side of the support element and protruding over a portion of the elongated recess of the support element.

18. The method of claim 17, further comprising:
establishing electronic communication between the electronic device and a peripheral component of the accessory; and
using the peripheral component with the electronic device while the accessory provides sole support for the electronic device in the inclined orientation.

19. The method of claim 18, comprising using the peripheral component with the electronic device while the support element of the accessory provides sole support for the electronic device in the inclined orientation.

20. The method of claim 18, comprising using the peripheral component with the electronic device while the elongated recess of the support element of the accessory provides sole support for the electronic device in the inclined orientation.

* * * * *